US012034735B2

(12) United States Patent
Guy et al.

(10) Patent No.: US 12,034,735 B2
(45) Date of Patent: *Jul. 9, 2024

(54) METHOD FOR VERIFYING SECURITY TECHNOLOGY DEPLOYMENT EFFICACY ACROSS A COMPUTER NETWORK

(71) Applicant: Sevco Security, Inc., Austin, TX (US)

(72) Inventors: Jeffrey J. Guy, Austin, TX (US); Dean Mekkawy, Austin, TX (US); Nevins Bartolomeo, Austin, TX (US); Luis Diego Cabezas, Austin, TX (US); Aaron Griffin, Austin, TX (US); Jacob Hackett, Austin, TX (US); Michael Alfonse, Austin, TX (US); Craig Cason, Austin, TX (US); Mark Shipley, Austin, TX (US); Jason McFarland, Austin, TX (US); Nicholas Murdock, Austin, TX (US); Steve Taylor, Austin, TX (US); Aaron Smith, Austin, TX (US)

(73) Assignee: Sevco Security, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/371,891

(22) Filed: Sep. 22, 2023

(65) Prior Publication Data

US 2024/0015165 A1   Jan. 11, 2024

Related U.S. Application Data

(63) Continuation-in-part of application No. 18/129,575, filed on Mar. 31, 2023, which is a continuation of
(Continued)

(51) Int. Cl.
H04L 9/40 (2022.01)
G06F 9/455 (2018.01)
(Continued)

(52) U.S. Cl.
CPC ........ *H04L 63/104* (2013.01); *G06F 9/45558* (2013.01); *H04L 41/0893* (2013.01);
(Continued)

(58) Field of Classification Search
CPC ... H04L 63/104; H04L 41/0893; H04L 41/12; H04L 63/102; G06F 9/45558
See application file for complete search history.

(56) References Cited

U.S. PATENT DOCUMENTS 10,389,742 B2    8/2019  Devi Reddy et al.
10,701,049 B2 *  6/2020  Murthy ................... H04L 63/08
(Continued)

OTHER PUBLICATIONS

Office Action received in U.S. Appl. No. 18/129,575 dated Jan. 11, 2024.
(Continued)

*Primary Examiner* — Oleg Korsak
(74) *Attorney, Agent, or Firm* — Run8 Patent Group, LLC; Peter Miller; Brian T. Chew

(57) ABSTRACT

A method includes: accessing objects, generated by a set of sources, representing attributes of assets, affiliated with a computer network, including a set of endpoint devices and a first application; partitioning the objects into object groups including a first object group representing the first application; aggregating objects in the first object group into a first user container representing the first application during the first time interval; and, in response to selection of the first application at an operator portal: generating a visualization representing a subset of endpoint devices, in the set of endpoint devices, on which the first application is installed during the first time interval based on a set of attributes, exhibited by the first application during the first time interval, contained in the first application container; and rendering the visualization at the operator interface.

21 Claims, 8 Drawing Sheets

Related U.S. Application Data application No. 17/720,163, filed on Apr. 13, 2022, now Pat. No. 11,647,027.

(60) Provisional application No. 63/174,485, filed on Apr. 13, 2021, provisional application No. 63/281,980, filed on Nov. 22, 2021, provisional application No. 63/408,955, filed on Sep. 22, 2022, provisional application No. 63/411,544, filed on Sep. 29, 2022.

(51) Int. Cl.
*H04L 41/0893* (2022.01)
*H04L 41/12* (2022.01)

(52) U.S. Cl.
CPC ............ *H04L 41/12* (2013.01); *H04L 63/102* (2013.01); *G06F 2009/45587* (2013.01); *G06F 2009/45595* (2013.01)

(56) References Cited

U.S. PATENT DOCUMENTS

| | | | |
|---|---|---|---|
| 10,855,715 B2 | 12/2020 | Martin et al. | |
| 11,647,027 B2* | 5/2023 | Guy | G06F 9/45558 726/1 |
| 2014/0344452 A1* | 11/2014 | Lipstone | H04L 65/612 709/224 |
| 2014/0344453 A1* | 11/2014 | Varney | H04L 41/0803 709/224 |
| 2018/0004948 A1 | 1/2018 | Martin et al. | |
| 2018/0139227 A1 | 5/2018 | Martin et al. | |
| 2018/0183821 A1 | 6/2018 | Schneider et al. | |
| 2020/0213289 A1* | 7/2020 | Murthy | H04L 63/0227 |
| 2020/0358796 A1 | 11/2020 | Kundu et al. | |
| 2021/0157920 A1* | 5/2021 | Zheng | G06F 21/566 |
| 2021/0281591 A1 | 9/2021 | Furtak | |

OTHER PUBLICATIONS

Heberle et al. InteractiVenn: a web-based tool for the analysis of sets through Venn diagrams, BMC Bioinformatics (2015), 7 pages, 2015.

Non-Final Office Action for U.S. Appl. No. 17/720,163, dated Aug. 29, 2022.

Notice of Allowance and Fees Due for U.S. Appl. No. 17/861,007 dated Jan. 5, 2023.

* cited by examiner

METHOD FOR VERIFYING SECURITY TECHNOLOGY DEPLOYMENT EFFICACY ACROSS A COMPUTER NETWORK

CROSS-REFERENCE TO RELATED APPLICATIONS

This application is a continuation-in-part of U.S. patent application Ser. No. 18/129,575, filed on 31 Mar. 2023, which is a continuation of U.S. patent application Ser. No. 17/720,163, filed on 13 Apr. 2022, which claims the benefit of U.S. Provisional Application No. 63/174,485, filed on 13 Apr. 2021, and U.S. Provisional Application No. 63/281,980, filed on 22 Nov. 2021, each of which is incorporated in its entirety by this reference.

This application claims the benefit of U.S. Provisional Application No. 63/408,955, filed on 22 Sep. 2022, and U.S. Provisional Application No. 63/411,544, filed on 29 Sep. 2022, each of which is incorporated in its entirety by this reference.

TECHNICAL FIELD

This invention relates generally to the field of Internet security and more specifically to a new and useful method for verifying security technology deployment efficacy across a computer network within the field of Internet security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
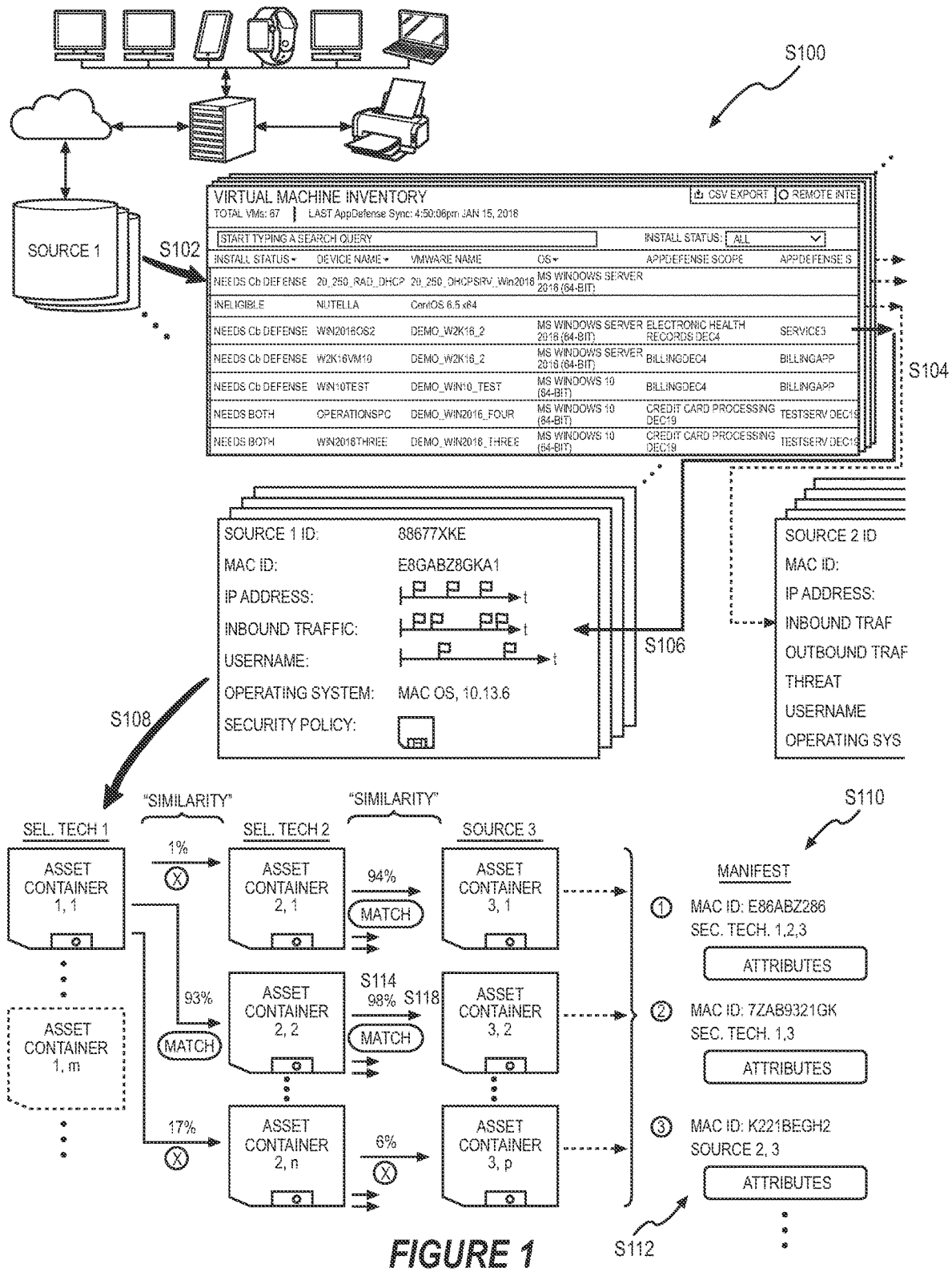
FIG. 1 is a flowchart representation of a method.
Figure 2:
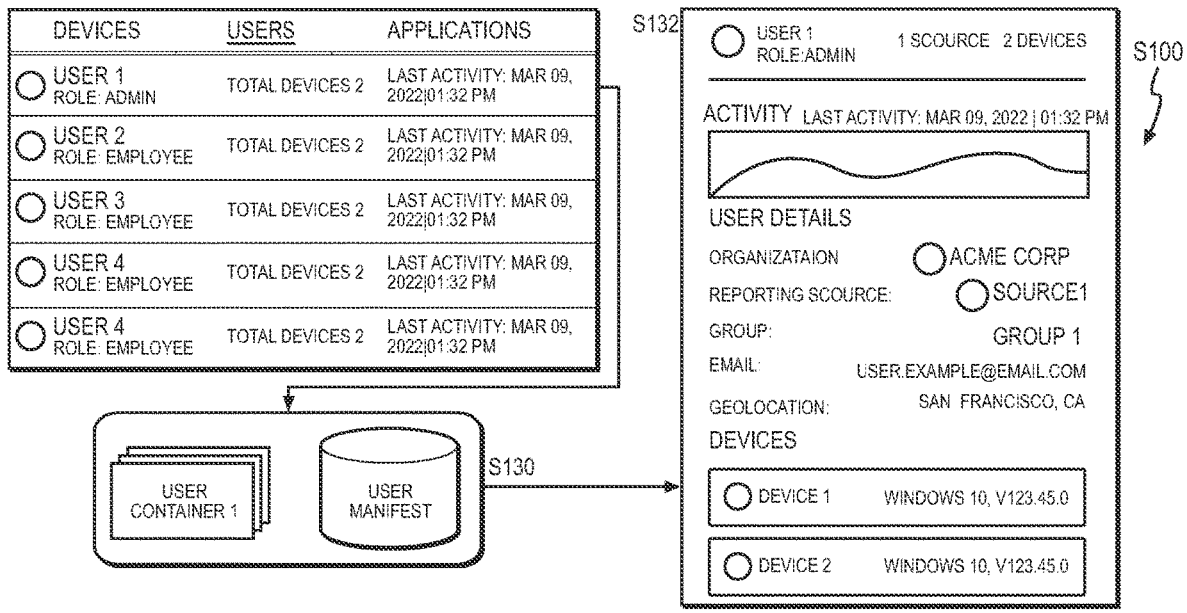
FIG. 2 is a flowchart representation of one variation of the method.

As shown in FIGS. 1 and 2, a method S100 includes: accessing a set of objects, generated by a set of sources during a first time interval, representing attributes of a set of assets affiliated with a computer network in Block S102, the set of assets including a set of endpoint devices and a set of users including a first user; extracting user identifying data from the set of objects in Block S104; partitioning the set of objects into a set of object groups based on the user identifying data in Block S106, each object group in the set of object groups representing a user in the set of users during the first time interval; for each object group in the set of object groups, aggregating attributes represented in objects in the object group into a user container, in the set of user containers, representing a user in the set of users in Block S108; generating a first manifest of users, including the first user, affiliated with the computer network during the first time interval based on the set of user containers in Block S110; and labeling each user in the first manifest of users with a set of attributes exhibited by the user during the first time interval based on a corresponding user container in the set of user containers in Block S112.

The method S100 also includes, in response to selection of the first user in the first manifest of users at an operator portal, generating a visualization representing a first set of attributes exhibited by the first user during the first time interval in Block S130, the first set of attributes including: a first activity status of the first user during the first time interval; and a first subset of endpoint devices, in the set of endpoint devices, associated with the first user during the first time interval.

1.1 Variation: User Representation by Sources

Figure 3:
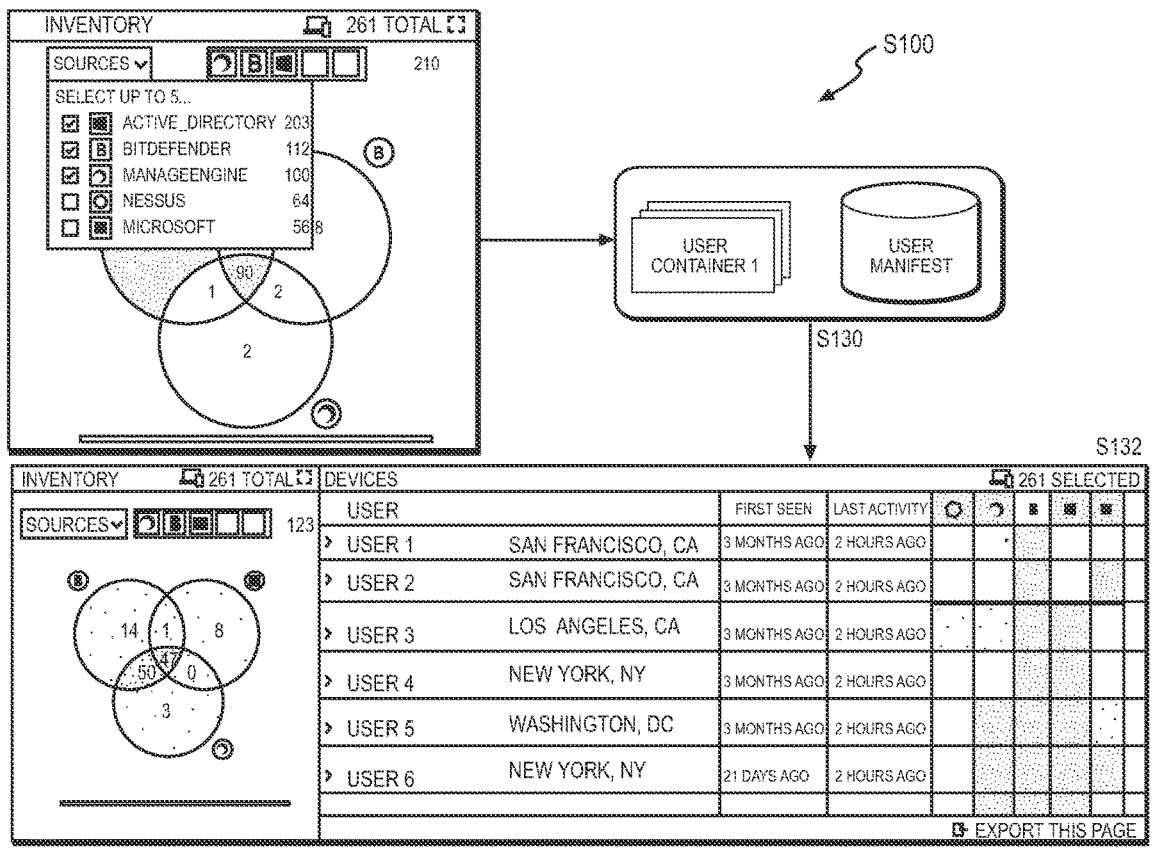
FIG. 3 is a flowchart representation of one variation of the method.

As shown in FIGS. 1 and 3, one variation of the method S100 includes generating a set of user containers by, for each source in a set of sources: accessing a set of objects, generated by the source during a first time interval, representing attributes of a subset of users in a set of users affiliated with a computer network in Block S102; partitioning the set of objects into a set of object groups, each object group in the set of object groups representing a user in the subset of users during the first time interval in Block S106; and for each object group in the set of object groups, aggregating objects in the object group into a user container, in a set of user containers, associated with the source and including fixed identifying data and variable status data representing a user in the subset of users in Block S108.

This variation of the method S100 also includes: identifying a first subset of users, in the set of users, represented by objects generated by a first source in the set of sources and objects generated by a second source in the set of sources based on correspondence between fixed identifying data and variable status data in a first subset of user containers associated with the first source and the second source in Block S134; and identifying a second subset of users, in the set of users, represented by objects generated by the first source and excluded from objects generated by the second source based on absence of correspondence between fixed identifying data and variable status data in a second subset of user containers associated with the first source and the second source in Block S136.

This variation of the method S100 further includes, in Block S130, in response to selection of the first source and the second source, generating a visualization representing: the first subset of users represented by objects generated by the first source and objects generated by the second source; and the second subset of users represented by objects generated by the first source and excluded from objects generated by the second source.

1.2 Variation: User Manifest & Attributes

As shown in FIGS. 1 and 2, one variation of the method S100 includes: accessing a set of objects, generated by a set of sources during a first time interval, representing attributes of a set of users affiliated with a computer network in Block S102; partitioning the set of objects into a set of object groups, each object group in the set of object groups representing a user in the set of users in Block S106; for each object group in the set of object groups, aggregating objects in the object group into a user container, in a set of user containers, representing a user in the set of users during the first time interval in Block S108; generating a manifest of users affiliated with the computer network during the first time interval based on the set of user containers in Block SIlo; and labeling each user in the manifest of users with a set of attributes exhibited by the user during the first time interval based on a corresponding user container in the set of user containers in Block S112.

This variation of the method S100 also includes, in response to selection of a first user in the manifest of users at an operator portal: generating a visualization representing a first set of attributes exhibited by the first user during the first time interval in Block S122; and rendering the visualization at the operator portal in Block S132.

1.3 Variation: Application Manifest

Figure 4:
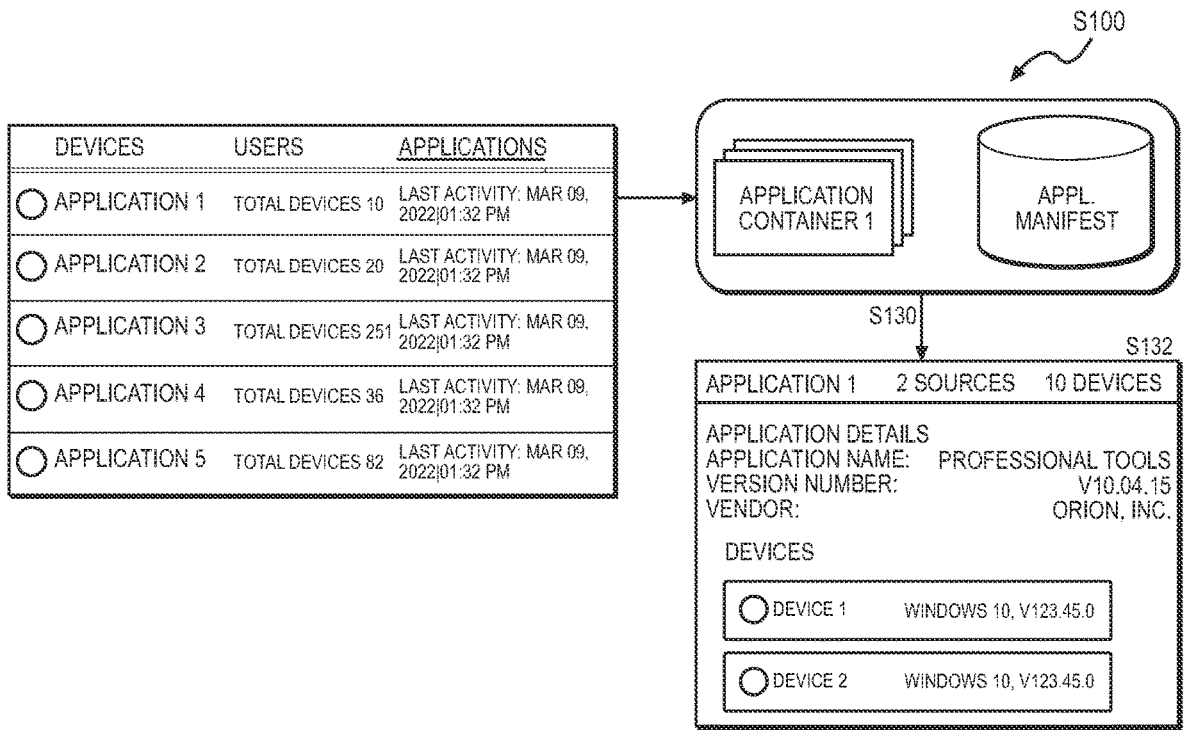
FIG. 4 is a flowchart representation of one variation of the method.

As shown in FIGS. 1 and 4, one variation of the method S100 includes: accessing a set of objects, generated by a set of sources during a first time interval, representing attributes of a set of assets affiliated with a computer network in Block S102, the set of assets including a set of endpoint devices and a set of applications including a first application; extracting application identifying data from the set of objects in Block S104; based on the application identifying data, partitioning the set of objects into a set of object groups including a first object group representing the first application during the first time interval in Block S106; aggregating attributes represented in objects in the first object group into a first application container, in a set of applications containers, representing the first application in Block S108; and generating a first manifest of applications, including the first application, installed on endpoint devices in the set of endpoint devices during the first time interval based on the set of application containers in Block S110.

This variation of the method S100 also includes: in response to selection of the first application in the first manifest of applications at an operator portal, generating a visualization representing a first set of attributes exhibited by the first application during the first time interval in Block S130, the first set of attributes including a first attribute representing a first subset of endpoint devices, in the set of endpoint devices, on which the first application is installed during the first time interval; and rendering the visualization at the operator interface in Block S132.

1.4 Variation: Application Permissions by User Group

Figure 5:
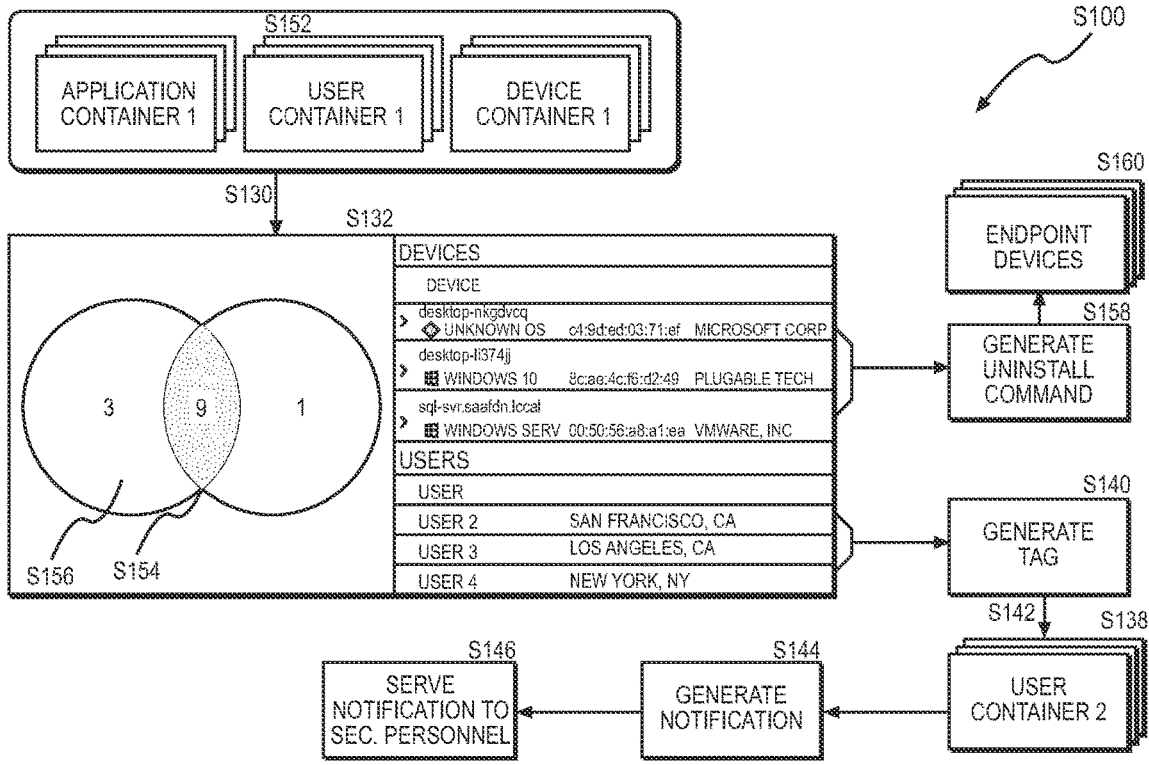
FIG. 5 is a flowchart representation of one variation of the method.

As shown in FIGS. 1 and 5, one variation of the method S100 includes: accessing a set of objects, generated by a set of sources during a first time interval, representing attributes of a set of assets affiliated with a computer network in Block S102, the set of assets including a set of endpoint devices, a set of applications including a first application and a set of users; and based on application identifying data in the set of objects, partitioning the set of objects into a first set of object groups including a first object group representing the first application during the first time interval in Block S106.

This variation of the method S100 also includes aggregating attributes represented in objects in the first object group into a first application container, in a set of applications containers, representing the first application in Block S108, the first application container including: a first attribute representing a first subset of endpoint devices, in the set of endpoint devices, on which the first application is installed during the first time interval; and a second attribute representing a first subset of users, in the set of users, assigned to the first subset of endpoint devices during the first time interval.

This variation of the method S100 further includes accessing a set of user containers in Block S152, each user container in the set of user containers: representing a user in the first subset of users; and including a third attribute representing a group to which the user is assigned during the first time interval.

This variation of the method S100 further includes, based on the first application container and the set of user containers: identifying a second subset of endpoint devices, in the first subset of endpoint devices, assigned to a second subset of users, in the first subset of users, assigned to a first group exhibiting permission associated with the first application in Block S154; and identifying a third subset of endpoint devices, in the first subset of endpoint devices, assigned to a third subset of users, in the first subset of users, assigned to a group absent permission associated with the first application in Block S156.

This variation of the method S100 also includes, in Block S130, generating a visualization representing: the second subset of endpoint devices, on which the first application is installed, assigned to the second subset of users assigned to the first group exhibiting permission associated with the first application; and the third subset of endpoint devices, on which the first application is installed, assigned to the third subset of users assigned to the group absent permission associated with the first application.

1.5 Variation: Device Identification for Deployed Application

As shown in FIGS. 1 and 4, one variation of the method S100 includes: accessing a set of objects, generated by a set of sources during a first time interval, representing attributes of a set of assets affiliated with a computer network in Block S102, the set of assets including a set of endpoint devices and a set of applications including a first application; based on application identifying data in the set of objects, partitioning the set of objects into a set of object groups including a first object group representing the first application during the first time interval in Block S106; and aggregating attributes represented in objects in the first object group into a first application container, in a set of applications containers, representing the first application in Block S108.

This variation of the method S100 also includes, in response to selection of the first application at an operator portal: generating a visualization representing a first subset of endpoint devices, in the set of endpoint devices, on which the first application is installed during the first time interval based on a first set of attributes, exhibited by the first application during the first time interval, contained in the first application container in Block S130; and rendering the visualization at the operator interface in Block S132.

2. Applications

Generally, a computer system (e.g., a local or remote computer system connected to or interfacing with a computer network) can execute Blocks of the method S100: to aggregate objects generated by various tools, systems, and other properties deployed on a first set of endpoint devices connected to a computer network during a first time interval; to identify correspondence between objects (e.g., based on fixed identifiers and/or variable status data); to fuse this correspondence between objects into an accurate inventory (or "manifest") of entities (or "assets")—such as endpoint devices, software applications, and users—affiliated with the computer network during the first time interval.

Accordingly, the computer system can execute Blocks of the method S100 to compile disparate logs and/or objects—published by various security technologies, productivity tools, and/or other non-security technologies deployed on devices connected to the network—into: a first manifest of all unique users affiliated with the computer network during a target time interval (e.g., a past hour, thirty days); and/or a second manifest all unique software applications installed (and/or accessed) on these devices connected to the computer network during the target time interval. Therefore, the computer system can execute Blocks of the method S100 to expose insights—to an operator (e.g., via an operator portal—pertaining to the computer network based on these manifests representing a comprehensive inventory of all assets affiliated with the computer network during the target time interval.

2.1 Operator Portal

More specifically, an operator portal (e.g., executing on a local device) can then execute Blocks of the method S100 to: render a user interface; and receive multiple application, user, and/or device search terms (e.g., specific versions of applications known to be defective and/or vulnerable to attack) from an operator. The operator portal (or the computer system) can then query the manifest(s) for these search terms and return a list of unique applications, unique users, and/or unique endpoint devices that match these specific versions of applications. The operator portal can then present this list to the operator, such as in a Venn diagram visualization.

2.2 User Inventory Hygiene

In one example application, the computer system and/or the operator portal execute Blocks of the method S100: to generate a user manifest—based on data from disparate sources—representing a comprehensive inventory of users affiliated with the computer network during a target time interval; to identify a subset of users, in the user manifest, exhibiting an inactive status during the target time interval; and to issue commands to these sources to remove (or delete) accounts corresponding to the subset of users. Therefore, the computer system and/or the operator portal execute Blocks of the method S100 to simplify user management within these sources by removing stale and/or irrelevant user data.

2.3 Device Identification for Deployed Application

In another example application, the computer system and/or the operator portal execute Blocks of the method S100: to generate an application manifest representing a comprehensive inventory of software applications installed on endpoint devices connected to the computer network during a target time interval; to receive selection of a first application in the application manifest; to generate a visualization representing a subset of endpoint devices on which the first application is installed during the target time interval; and to present this visualization to an operator.

Accordingly, the computer system and/or the operator portal execute Blocks of the method S100 to expose every unique endpoint device on which the first application is installed. Therefore, in response to identifying the first application as an unauthorized and/or vulnerable application, the computer system and the operator portal aid the operator by identifying these unique endpoint devices for investigation and/or remediation.

3. Computer Network and Devices

Generally, various devices may connect to an organization's computer network over time, such as: network devices, including hubs, switches, routers, bridges, gateways, modems, repeaters, and/or access points; and endpoint devices, including workstations, laptops, smartphones, printers, mobile kiosks, smartwatches, and/or printers. Sources—such as security technologies, non-security technologies, human resources management tools, IT helpdesk tools, vulnerability scanners—may be deployed on these devices, and the sources may generate data based on communication with these devices.

4. Asset Identification

Generally, the computer system can detect and distinguish individual assets (e.g., endpoint devices, software applications, users)—in a set of assets across a set of asset classes (e.g., device asset class, software asset class, user asset class)—connected to the computer network during discrete intervals, such as by: retrieving a set of objects (and/or registration logs, etc.) generated by a set of sources (e.g., security technologies, non-security technologies, human resources management tools, IT helpdesk tools, vulnerability scanners) designated for deployment on the computer network according to a security policy; identifying correspondence between objects (e.g., based on fixed identifying data and/or variable status data); fusing this correspondence into a manifest, for each asset class, containing one identifier for each asset represented in at least one object in this set of objects; and labeling each asset in the manifest with each source—in the set of sources—that published at least one object corresponding to the asset.

For example, the computer system can execute methods and techniques described in U.S. patent application Ser. No. 17/720,163, filed on 13 Apr. 2022, which is incorporated in its entirety by this reference, to: compile disparate logs published by various security technologies deployed on devices connected to the computer network into a first manifest (or "device manifest") for the device asset class; identify all unique devices connected to the computer network during a target time interval (e.g., a past hour); and label each unique device described in the first manifest with an exact combination of tracked security technologies executing on the device during the target time interval (e.g., based on the objects—published by these security technologies during the target time interval—that indicated the device).

4.1 Sources and Objects

Block S102 of the method S100 recites accessing a set of objects, generated by a set of sources during a first time interval, representing attributes of a set of assets affiliated with a computer network.

Generally, as shown in FIG. 1, each source may generate and publish objects for each device on which the source is deployed and active, such as: automatically on a regular interval; when endpoint devices connect to and disconnect from the network; and/or when called by the computer system (e.g., via API). For example, when deployed on endpoint devices connected to the computer network, a security technology populates registration objects (e.g., registration objects, log objects), each object representing attributes of an endpoint device and containing: a device name internal to the security technology; a MAC address of the endpoint device; a current IP address of the endpoint device; a username or user identifier of a user logged into the endpoint device; an operating system of the endpoint device; a security policy configuration of the security technology at the endpoint device; a registration time of the security technology at the endpoint device; a registration removal time of the security technology at the endpoint device; a time that the endpoint device connected to or disconnected from the computer network; an inbound packet size and sender identifier; an outbound packet size and recipient identifier; a packet communication protocol; and/or a timestamp; etc.

In one implementation, in Block S102, the computer system can access a set of objects, generated by a set of sources during a target time interval (e.g., a first time interval), representing attributes of a set of assets affiliated with a computer network.

For example, the computer system can access a first subset of objects—in the set of objects and generated by a first source (e.g., a security technology) in the set of sources during the target time interval—representing attributes of a first subset of assets, in the set of assets, including: a first subset of endpoint devices affiliated with the computer network during the first time interval; a first subset of applications installed on endpoint devices in the first subset of endpoint devices; and a first subset of users affiliated with the computer network during the first time interval. The computer system then can access a second subset of objects—in the set of objects and generated by a second source (e.g., a human resources management tool) in the set of sources during the target time interval—representing attributes of a second subset of assets, in the set of assets, including: a second subset of endpoint devices affiliated with the computer network during the first time interval; a second subset of applications installed on endpoint devices in the first subset of endpoint devices; and a second subset of users affiliated with the computer network during the first time interval. In this example, for each source in the set of sources, the computer system can access a subset of objects—in the set of objects—generated by the source during the target time interval and representing attributes of a subset of assets in the set of assets.

In another implementation, the computer system can access the set of objects: by directly polling endpoint devices connected to the computer network for objects representing status of these endpoint devices; and by calling a source for these objects via an application programming interface (hereinafter "API") of the source.

For example, the computer system can periodically poll devices, security technologies, and/or the computer network over time, such as on a predefined time interval of once per hour or once per day. Additionally or alternatively, the computer system can periodically poll subsets of devices and/or sources on the computer network at rolling intervals such that: the computer system collects objects substantially continuously throughout a polling interval; and each device and/or source responds to poll requests from the computer system once (e.g., only once) per time interval.

4.2 Asset Containers

Generally, in Block S106, the computer system can consolidate a target subset of objects generated by a source into object groups, each object group corresponding to one asset and containing one or more objects representing the asset during the target time interval. Then, for each object group, the computer system can aggregate objects in the object group into an asset container (e.g., endpoint device container, application container, user container) including fixed identifying data (e.g., MAC address, application identifier, employee identifier) and variable status data (e.g., IP address, location) representative of one unique asset in the set of assets in Blocks S108. More specifically, the computer system can: extract fixed identifying data and variable status data (or "attributes") from objects in an object group—published by different sources but identified by the computer system as corresponding to the same asset—and compile these data into a composite (or "singular") container representing the asset.

In one example, the computer system: detects a first application identifier value (e.g., denoted "ms_word_2209") corresponding to a first application in a first object published by a first source; detects a second application identifier value (e.g., denoted "word_16.0.15629.20208") corresponding to the first application in a second object published by a second source; correlates the first application identifier value and the second application identifier value as corresponding to the first application (but in an inconsistent format and lexicon); and normalizes the first application identifier value and the second application identifier value into a normalized application identifier value (e.g., denoted "ms_word_16.0.15629.20208"). In this example, the computer system also: detects a state value—representing a compromised state of the first application—in a third object published by the first source (which may not be captured in objects published by the second source); and detects a user identifier corresponding to a first endpoint device, on which the first application is installed, in a fourth object published by the second source (which may not be captured in objects published by the first source). The computer system then compiles the normalized application identifier value, the state value, and the user identifier into an application container corresponding to the first application.

Accordingly, the computer system can consolidate objects—published by different sources—into one representation of fixed and variable identifying data for each unique asset, including: correlated (and normalized) data that is common across these sources; and raw data that is unique to a single source (and/or that may not be correlatable across multiple sources). Therefore, the computer system can characterize an asset with a complete set of attributes in a consistent format and lexicon.

In one implementation, the computer system can: extract identifying data from a first target subset of objects generated by a first source in the set of sources during the target time interval in Block S104; and partition the first target subset of objects into a set of object groups based on the identifying data in Block S106. Then, for each object group in the set of object groups, the computer system can aggregate attributes represented in objects in the object group into an asset container, in the set of asset containers, representing an asset in Block S108.

For example, the computer system can aggregate attributes represented in objects in a first object group—representing a first application—into an application container representing the first application, such as: a first attribute representing a first subset of endpoint devices on which the first application is installed during a target time interval; and a second attribute representing a subset of users assigned to the first subset of endpoint devices during the target time interval.

4.3 Asset Manifests

Generally, the computer system can fuse a set of asset containers—derived from isolated, internal logs published by disconnected sources—into one manifest identifying all unique assets connected to the computer network during the target time interval and the particular combinations of sources that detected each unique asset during the target time interval. Based on fixed identifying data and variable status data contained in asset containers in the set of asset containers associated with the set of security technologies, the computer system can: generate a manifest (or "aggregation") of assets affiliated with the computer network during the target time interval in Block S110; and label each asset in the manifest with a set of attributes exhibited by the asset during the target time interval based on a corresponding asset container in the first set of asset containers in Block S112. For example, the computer system can label a first asset in the manifest with a first set of attributes exhibited by the first asset during the target time interval based on fixed identifying data and/or variable status data—attributed to the target time interval—contained in a first asset container representing the first asset.

In one implementation, the computer system can: generate a device manifest representing unique endpoint devices connected to the computer network during a target time interval; and label each unique endpoint device in the device manifest with a set of attributes (or a subset of attributes) exhibited by the endpoint device during the target time interval.

In another implementation, the computer system can: generate a user manifest representing unique users affiliated with the computer network during the target time interval; and label each unique user in the user manifest with a set of attributes (or a subset of attributes) exhibited by the user during the target time interval.

In yet another implementation, the computer system can: generate an application manifest representing unique applications installed on endpoint devices connected to the computer network during the target time interval; and label each unique application in the application manifest with a set of attributes (or a subset of attributes) exhibited by the application during the target time interval.

4.3.1 Asset Manifest Update

The computer system can repeat the foregoing methods and techniques to update the manifest with assets—and their attributes—connected to the computer network over time, such as once per hour, twice per day, or daily.

4.4 User Inventory Unification

Blocks of the method S100 recite: extracting user identifying data from the set of objects in Block S104; partitioning the set of objects into a set of object groups based on the user identifying data in Block S106, each object group in the set of object groups representing a user in the set of users during the first time interval; and, for each object group in the set of object groups, aggregating attributes represented in objects in the object group into a user container, in the set of user containers, representing a user in the set of users in Block S108.

Figure 6A:
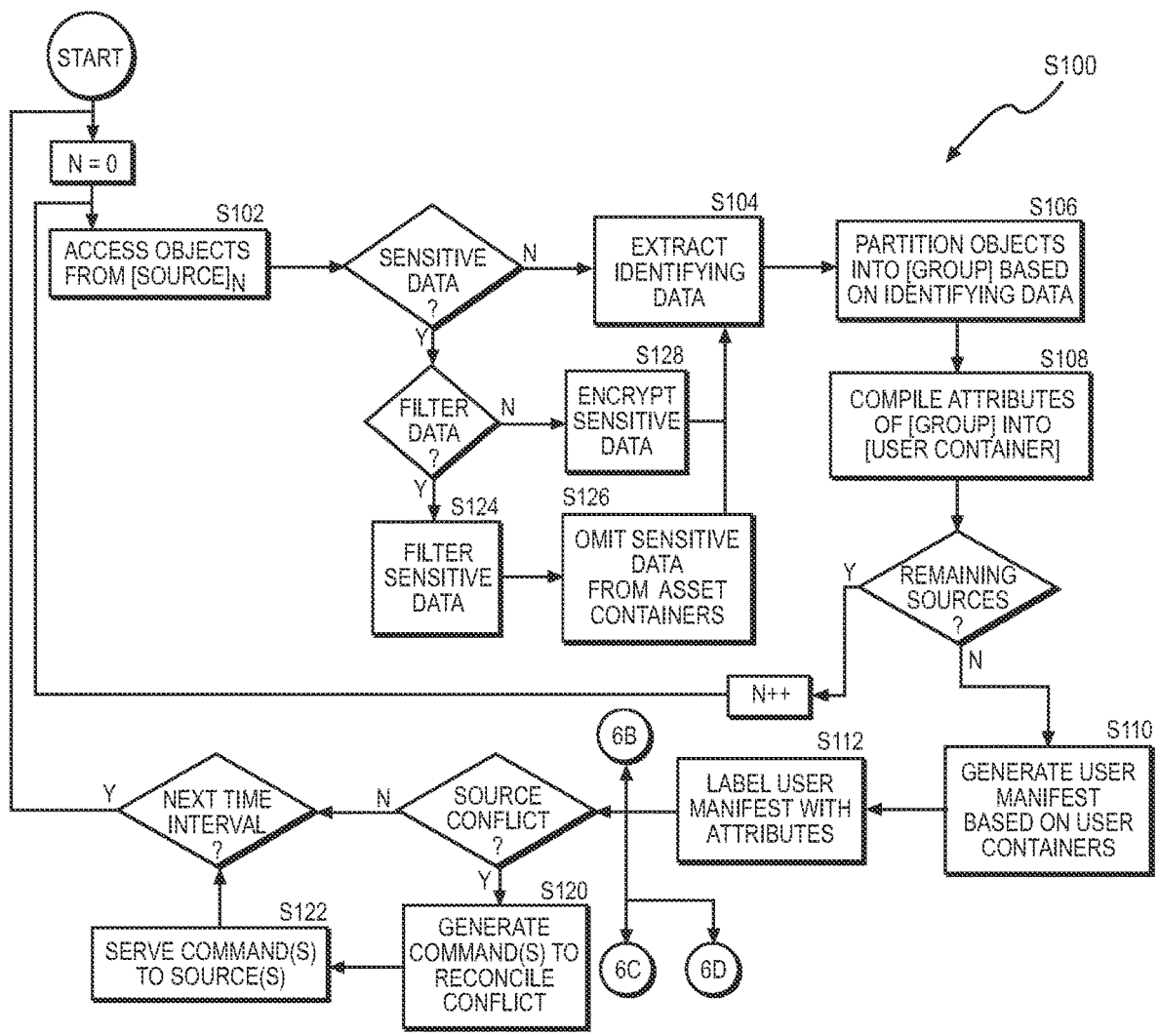
FIGS. 6A, 6B, 6C, and 6D are a flowchart representation of one variation of the method.

In one implementation, as shown in FIG. 6A, the computer system can access a target subset of objects generated by a first source, in a set of sources, during a target time interval in Block S102.

In another implementation, the computer system can: extract user identifying data (e.g., fixed identifying data, variable status data) from the first target subset of objects in Block S104; and partition the set of objects into a first set of object groups based on the user identifying data in Block S106, each object group in the first target subset of object groups including a sequence of objects—generated by the first source—involving one user in a set of users during the target time interval. For each object group, the computer system can then aggregate objects in the object group into a user container including fixed identifying data and variable status data representative of one user in the set of users in Block S108.

In one implementation, the computer system can populate a user container with: a set of user attributes (e.g., name of a user, user identifier, password, email address, location, group, role, time/date of last activity, time/date of last login, time/date of last password change); a set of endpoint devices with login by the user within a time interval (e.g., 30 days); a set of device attributes for each endpoint device in the set of devices (e.g.: MAC address; IP address; operating system; location; device type; installed security technologies, non-security technologies, productivity tools, software applications; device configuration); software license instances associated with the user; a set of permissions associated with the user; and/or any other information associated with the user.

The computer system can then repeat this process for each other source, in the set of sources, to generate a set of user containers associated with each source designated by the security policy.

Accordingly, the computer system can: partition a set of objects into the set of object groups including a first object group representing a first user—in a set of users —during a target time interval (e.g., a first time interval); and aggregate attributes represented in objects in the first object group into a first user container, in the set of user containers, representing the first user.

4.4.1 User Inventory Unification by User Identifier

In one implementation, the computer system scans the first target subset of objects—associated with the first source—for unique internal user identifiers assigned to users by the first source. Then, for a first unique internal user identifier, the computer system can: isolate an object group containing this unique internal user identifier; extract fixed identifying data (e.g., name of user, login username, employee number, email address(es)) from this object group; and extract timeseries object-based identifying data from this object group. For example, the computer system can extract and aggregate timeseries object-based identifying data from this object group to generate: a first timeseries of endpoint device logins by the user; a second timeseries of network connection and disconnection instances by an endpoint device on which the user is logged in; a third timeseries of software application logins by the user; a fourth timeseries of software application activity by the user; a fifth timeseries of IP addresses (and/or physical locations) associated with an endpoint device(s) on which the user is logged in; a sixth timeseries of security policy configurations at an endpoint device on which the user is logged in; a seventh timeseries of password changes; an eighth timeseries of role assignments corresponding to the user; and/or a ninth timeseries of modifications to a set of permissions associated with the user; etc. Alternatively, the computer system can store extract single-point values in these domains from the object group. The computer system can then compile these fixed and object-based data into one application container associated with the first unique internal application identifier.

The computer system can then repeat this process for each other unique internal user identifier represented in the first target subset of objects generated by the first source to generate a first set of user containers associated with the first source. Therefore, the computer system can consolidate the first target set of objects—published by the first source during the target time interval—into one representation of fixed and object-based user identifiers for each unique user for which the first source generates objects.

The computer system can then repeat this process for each other source, in the set of sources, to generate a set of user containers associated with each source designated by the security policy.

Alternatively, rather than poll a source for objects and then fuse these objects into a group of unique objects, the computer system can poll the source directly for this group of objects (e.g., via API call) and then aggregate these objects into a user container for the source.

4.4.2 User Inventory Unification by User Identifying Data

Additionally or alternatively, the computer system can: access a target set of objects generated by the set of sources during the target time interval; and extract user identifying data (e.g., fixed identifying data, timeseries object-based data) from the target set of objects. The computer system can: detect intersections and disjoints between user identifying data in the set of objects; and group subsets of the target set of objects into user containers based on intersections between user identifying data in the set of objects.

For example, the computer system can: group a first subset of objects, in the set of objects, into a first user container based on a first intersection between user identifying data in these set of objects (e.g., a first username associated with a first user); and group a second subset of objects, in the set of objects, into a second user container based on a second intersection between user identifying data in the second set of objects (e.g., a second username associated with a second user). In this example, the first user container and the second user container exhibit disjointed (e.g., distinct) user identifying data.

The computer system can then compile fixed and object-based data associated with the subset of objects into a user container. For example, the computer system can: compile fixed identifying data and variable status data associated with the first subset of objects into the first user container associated with the first intersection; and compile fixed identifying data and variable status data associated with the second subset of objects into the second user container associated with the second intersection.

4.4.3 User Inventory Unification by Similarity

Block S114 of the method S100 recites calculating a first correspondence score for the first user container and the second user container based on: similarities of fixed identifying data stored in the first user container and the second user container; and similarities of concurrent variable status data stored in the first user container and the second user container.

Blocks of the method S100 recites, in response to the first correspondence score exceeding a threshold correspondence score: identifying the first user container and the second user container as corresponding to the first user in Block S116; and compiling fixed identifying data and variable status data contained in the first user container and the second user container into a first representation of the first user during the first time interval in Block S118.

Generally, in Blocks S114 and S116, the computer system can: calculate similarities between user containers across all sources designated in the security policy; and identify groups of user containers that correspond to the same user based on attributes features stored in these user containers. The computer system can then compile fixed identifying data and variable status data contained in these user containers—containing objects published by different sources but identified by the computer system as corresponding to the same user—into a composite (or "singular") container representing of the user during the current time interval in Block S118.

In one implementation, the computer system can: select a first user container associated with a first source; select a second user container associated with a second source; extract a first set of values in a first domain (e.g., a name, a login username) from the first user container and the second user container; calculate a correspondence score between this first set of values in the first domain (e.g., 1.0 if these login usernames are identical; 0.5 if these login usernames are different but similar; 0.01 if these login usernames are very dissimilar); extract a second set of values in a second domain (e.g., IP addresses) from the first and second user containers; calculate a correspondence score between this second set of values in the second domain (e.g., 1.0 if these IP addresses are identical; 0.5 if these IP addresses are different but similar; 0.01 in these IP addresses are very dissimilar); and repeat this process for each other domain represented in both the first user container and the second user container.

The computer system can then compile these correspondence scores into one composite correspondence score representing similarity between the first user container and the second user container across all domains represented in both the first user container and the second user container. For example, when compiling these correspondence scores, the computer system can implement different weights for each domain, such as: a weight of to for name correspondence scores; a weight of 0.9 for MAC address correspondence scores; a weight of 0.8 for concurrent IP address correspondence scores; a weight of 0.5 for concurrent login username correspondence scores; a weight of 0.3 for concurrent outbound data packet correspondence scores; and/or a weight of 0.2 for concurrent inbound data packet correspondence scores; etc. In this example, the computer system can then: multiply each correspondence score between the first user container and the second user container by its corresponding weight; calculate a sum of these weighted correspondence scores; and store the sum as the composite correspondence score between the first user container and the second user container.

The computer system can then repeat this process to generate a first set of composite correspondence scores that represent similarities between the first user container and each other user container associated with the second source.

The computer system can then identify highest composite correspondence score in this first set of composite correspondence scores. In response to this highest composite correspondence score—between the first user container associated with the first source and a second user container associated with the second source—exceeding a threshold correspondence score, the computer system can: identify these user containers as corresponding to the same user (e.g., a first user) in Block S120; and confirm that both the first and second sources are actively generating objects associated with the first user during the target time interval.

In another implementation, in Block S118, in response to identifying the first user container and the second user container as corresponding to the first user, the computer system can merge data in the first user container with data in the second user container to generate a third user container including an aggregate set of data associated with the first user. More specifically, the computer system can: detect values in each domain—represented in the first user container and the second user container—exhibiting a correspondence score exceeding a predefined threshold (e.g., 0.8, 1.0); and populate the third user container with these values.

In one example, the computer system extracts: a first login username represented in the first user container; and a second login username, represented in the second user container, exhibiting a similarity score of 1.0 representing these login usernames are identical. In response to the correspondence score exceeding a threshold (e.g., 0.8), the computer system populates the third user container with the first login username (or the second login username). The computer system repeats this process for each domain represented by the first user container and the second user container to populate values into the third user container based on similarity.

In another example, the computer system: extracts a first name value (e.g., denoted "John Smith") from the first user container; extracts a second name value (e.g., denoted "John J. Smith") from the second user container; and compiles the first name value and the second name value into a normalized name value (e.g., denoted "John J. Smith") of the first user based on stored name handling characteristics of the sources. More specifically, the computer system: generates the normalized name value—representing the first user—based on the first name value and the second name value; and compiles the normalized name value into the third user container.

Furthermore, the computer system can: detect values in each domain—represented in the first user container and the second user container—exhibiting a similarity score falling below a predefined threshold (e.g., 0.5); and omit these values from third user container.

For example, the computer system can detect a first IP address, represented in the first user container, and a second IP address, represented in the second user container, exhibiting a similarity score of 0.4 representing these IP addresses are different but similar. In response to detecting the similarity score falls below a threshold (e.g., 0.6), the computer system can omit the first IP address and the second IP address from the third user container. The computer system can repeat this process for each domain represented by the first user container and the second user container to populate values into the third user container based on similarity.

Additionally, in response to populating values into the third user container based on similarity for each domain represented by the first user container and the second user container, the computer system can remove the first user container and the second user container. Accordingly, the computer system can thus remove redundant user containers.

In one variation, the computer system can merge data in the first user container with data in the second user container by compiling data in the first user container into the second user container. Alternatively, the computer system can merge data in the first user container with data in the second user container by compiling data in the second user container into the first user container.

In another variation, the computer system can: aggregate a first activity status, generated by a first source and representing an active status of the first user during a first time interval, into a first user container corresponding to the first user; and aggregate a second activity status, generated by a second source and representing an inactive status of the first user during the first time interval, into a second user container corresponding to the first user. In this variation, the computer system can compile the first activity status—representing the active status of the first user during the first time interval—into the first user container, the second user container, and/or the third user container.

Additionally, the computer system can: generate a command to update the second activity status to the first activity status at the second source in Block S120; and transmit the command to the second source in Block S122. Alternatively, the computer system can: generate a command to update the first activity status to the second activity status; and transmit the command to the first source.

Accordingly, the computer system can: identify a conflict between activity statuses reported by multiple sources; and issue a command—to at least one of these sources—to update an activity status to reconcile the conflict. Therefore, the computer system can prevent active users—erroneously detected as inactive—from being removed or deleted from a source due to inactivity.

4.4.4 User Manifest

Blocks of the method S100 recite: generating a first manifest of users, including the first user, affiliated with the computer network during the first time interval based on the set of user containers in Block S110; and labeling each user in the first manifest of users with a set of attributes exhibited by the user during the first time interval based on a corresponding user container in the set of user containers in Block S112.

In one implementation, the computer system can: access the set of user containers; based on the set of user containers, generate a user manifest representing unique users affiliated with the computer network during the target time interval in Block S110; and label each unique user in the user manifest with a set of attributes (or a subset of attributes) exhibited by the user during the target time interval in Block S112.

For example, for a first user in the set of users, the computer system can: write a first unique user identifier for this first user to the manifest; and label the first user identifier with additional attributes of the first user—derived from (and/or stored in) the user container representing the first user—in the user manifest, such as: a name(s) of the first user; a login username(s), an employee identifier; a set of email addresses; an endpoint device(s) logged in to by the first user; a last network connection time of an endpoint device logged in to by the first user; a location of the user; a password; a date/time of last password change; a date/time of last activity by the first user; a group(s) in which the first user is a member; a role(s) of the first user; and/or a set of tags associated with the first user; etc.

Additionally or alternatively, the computer system can label each application in the application manifest with a combination of sources that detected the application during the target time interval.

4.5 Software Inventory Unification

Blocks of the method S100 recite: extracting application identifying data from the set of objects in Block S104; based on the application identifying data, partitioning the set of objects into a set of object groups including a first object group representing the first application during the first time interval in Block S106; and aggregating attributes represented in objects in the first object group into a first application container, in a set of applications containers, representing the first application in Block S108.

Figure 7A:
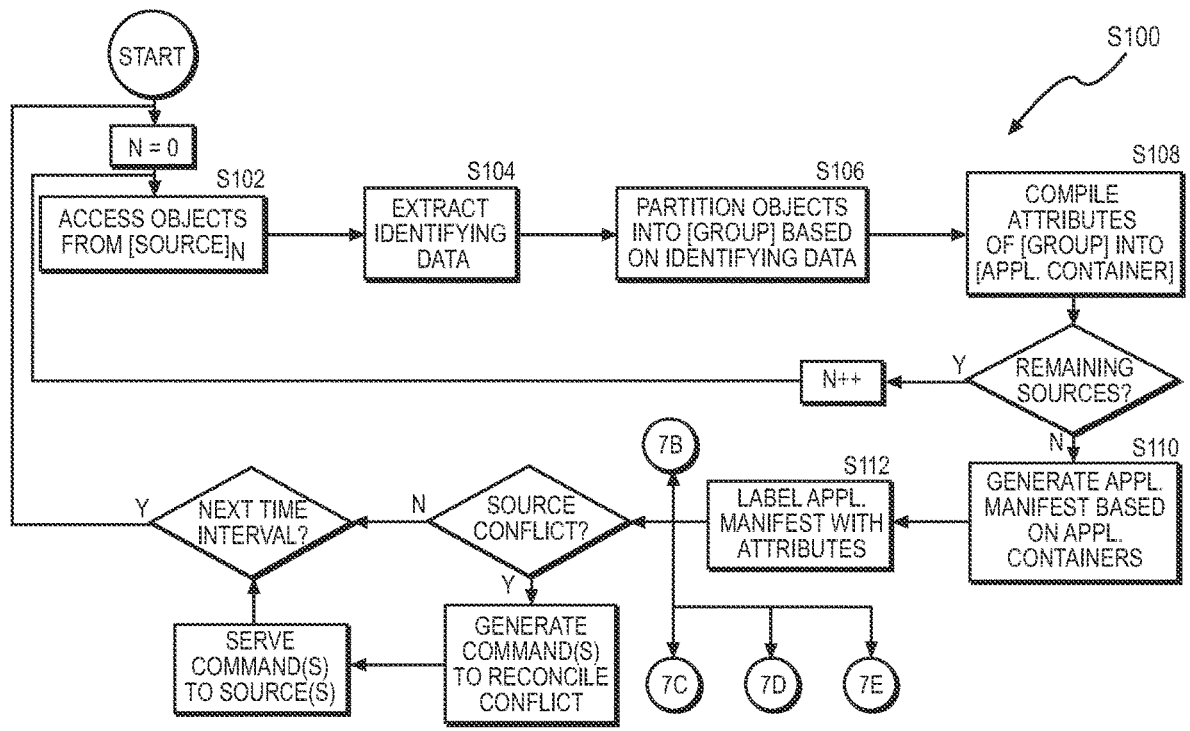
FIGS. 7A, 7B, 7C, 7D, and 7E are a flowchart representation of one variation of the method.

Additionally or alternatively, as shown in FIG. 7A, the computer system can execute similar methods and techniques described above: to retrieve a set of objects generated by the set of sources; to identify application correspondence between objects; to fuse this application correspondence into an application manifest containing one identifier for each application represented in at least one object in this set of objects; and to label each application in the application manifest with each source—in the set of sources—that generated at least one object corresponding to the application.

In one implementation, the computer system can scan a first target subset of objects—generated by a first source—for unique internal application identifiers assigned to applications by the first source in Block S104. Then, for a first unique internal application identifier, the computer system can: isolate an object group containing this unique internal application identifier in Block S106; extract fixed identifying data (e.g., application name, software vendor, version number, patch level, license identifier) from this object group; and extract timeseries object-based identifying data from this object group. For example, the computer system can extract and aggregate timeseries object-based identifying data from this object group to generate: a first timeseries of application login usernames; a second timeseries of application configurations; a third timeseries of MAC addresses; a fourth timeseries of IP addresses; a fifth timeseries of inbound data packets for the application, including size and source IP address; a sixth timeseries of outbound data packets from the application, including size and destination IP address; a seventh timeseries of software application activity; an eighth timeseries of security policy configurations at an endpoint device; a ninth timeseries of application license identifiers, etc. The computer system can then compile these fixed and object-based data into one application container associated with the first unique internal application identifier in Block S108.

The computer system can then repeat this process for each other unique internal application identifier represented in the first target subset of objects generated by the first source to generate a first set of application containers associated with the first source. Therefore, the computer system can consolidate the first target set of objects—generated by the first source during the target time interval—into one representation of fixed and object-based user identifiers for each unique application for which the first source generates objects.

The computer system can then repeat this process for each other source, in the set of sources, to generate a set of application containers associated with each source designated by the security policy.

Additionally or alternatively, the computer system can execute methods and techniques described above: to access a set of objects generated by the set of sources during a target time interval; to extract application identifying data (e.g., fixed identifying data, timeseries object-based data) from the set of objects; to detect intersections and disjoints between application identifying data from the set of objects; and to group subsets of the target set of objects into application containers based on intersections between application identifying data in the set of objects.

In one implementation, the computer system can access a first subset of objects generated by a first source configured on a first endpoint device in the first subset of endpoint devices, the first subset of objects defining a set of applications: installed on the first endpoint device during the target time interval; and including the first application. In this implementation, the computer system can: partition the set of objects into the set of object groups including a first object group including this first subset of objects; and aggregate an attribute representing the first endpoint device—on which the first application is installed—into an application container associated with the first application.

4.4.2 Software Inventory Unification by Similarity

Block S114 of the method S100 recites calculating a first correspondence score for the first application container and the second application container based on: similarities of fixed identifying data stored in the first application container and the second application container; and similarities of concurrent variable status data stored in the first application container and the second application container.

Blocks of the method S100 recite, in response to the first correspondence score exceeding a threshold correspondence score: identifying the first application container and the second application container as corresponding to the first application in Block S116; and compiling fixed identifying data, including the second unique internal application identifier assigned to the first application by the second source, and variable status data contained in the second application container into the first application container in Block S118.

The computer system can execute similar methods and techniques described above to identify groups of application containers that correspond to the same application, such as by correspondence score.

More specifically, the computer system can execute similar methods and techniques described above to calculate a correspondence score between a first application container and a second application container based on similarities of fixed identifying data and/or concurrent variable status data stored in these application containers in Block S114. In response to the correspondence score exceeding a threshold correspondence score, the computer system can: identify the first application container and the second application container as corresponding to the same application in Block S116; and merge fixed identifying data and variable status data—stored in the first application container and the second application container—into one representation of the application in Block S118.

In one example, the computer system compiles fixed identifying data—including a second unique internal application identifier assigned to the first application by the second source—and variable status data contained in the second application container into the first application container. The computer system then removes the second application container.

4.4.3 Application Manifest

Block S110 of the method S100 recites generating a first manifest of applications—including the first application—installed on endpoint devices in the set of endpoint devices during the first time interval based on the set of application containers.

In one implementation, the computer system can execute similar methods and techniques described above: to access the set of application containers; to generate an application manifest—based on the set of application containers—representing unique applications installed on endpoint devices connected to (and/or affiliated with) the computer network during the target time interval in Block S110; and to label each unique application in the application manifest with a set of attributes (or a subset of attributes) exhibited by the application during the target time interval in Block S112.

For example, for a first application in the set of applications, the computer system can: write a first unique application identifier for this first application to the manifest; and label the first application identifier with additional attributes of the first application—derived from (and/or stored in) the application container representing the first application—in the application manifest, such as: a name(s) of the first application; a version of the first application, a manufacturer (or vendor) of the first application; a set endpoint device on which the first application is installed; a set of users by which the first application is accessed; user group(s) associated with the first application; user role(s) associated with the first application; a set of licenses associated with the first application (e.g., total number of available license instances for the first application, total number of license instances used); a set of tags associated with the first application; etc.

Additionally or alternatively, the computer system can label each application in the application manifest with a combination of sources that detected the application during the target time interval.

4.5 Device Inventory Unification & Manifest

Generally, the computer system can execute similar methods and techniques described above and/or described in U.S. patent application Ser. No. 17/720,163: to compile disparate logs published by various sources into a set of device containers representing attributes of endpoint devices; to generate a device manifest—based on the set of endpoint device containers—defining all unique endpoint devices connected to and/or affiliated with the computer network during a target time interval; and to label each unique endpoint device defined in the device manifest with a set of attributes (or a subset of attributes) exhibited by the endpoint device during the target time interval.

4.6 Sensitive Information

In one implementation, the computer system can access an object, in the set of objects, defining an attribute representing sensitive information. In one example, the computer system accesses a first object defining a first attribute representing a secret question and answer keypair associated with a first user. In another example, the computer system accesses a second object defining a second attribute representing a salary associated with a second user.

In another implementation, in response to accessing an object defining an attribute representing sensitive information, the computer system can: filter the attribute based on the sensitive information in Block S124; and omit the first attribute from the set of user containers in Block S126.

In one variation, in response to accessing an object defining an attribute representing sensitive information, the computer system can: encrypt the attribute as an encrypted attribute in Block S128; and aggregate the encrypted attribute into the user container in Block S108. For example, the computer system can encrypt the attribute based on a cryptographic function.

In another variation, in response to accessing an object defining an attribute representing sensitive information, the computer system can: mask (or obfuscate) the attribute as a masked attribute; and aggregate the masked attribute into the user container.

5. Operator Interface and Visualizations

Generally, the computer system interfaces with an operator (e.g., a security analyst, a network administrator) via an operator portal: to receive selection of a manifest of interest; and to generate a visualization representing unique assets (e.g., users, applications, endpoint devices) within the manifest during the target time interval.

In one implementation, the computer system can: receive selection of a manifest of users (or "user manifest") at the operator portal; and to generate a visualization representing unique users within the manifest.

In another implementation, the computer system can: receive selection of a manifest of applications (or "application manifest") at the operator portal; and to generate a visualization representing unique applications within the manifest.

Alternatively, the computer system can: receive selection of a manifest of endpoint devices (or "device manifest") at the operator portal; and to generate a visualization representing unique endpoint devices within the manifest.

The computer system can render the visualization at the operator portal.

5.1 Real-Time User Inventory Visualization

Blocks of the method S100 recite, in response to selection of the first user in the first manifest of users at an operator portal: generating a visualization representing a first set of attributes exhibited by the first user during the first time interval in Block S130; and rendering the visualization at the operator portal in Block S132.

In one implementation, the computer system: automatically sets the target time interval to a real-time sampling window, such as from a preceding hour up to the current time; and executes the foregoing methods and techniques to generate a manifest based on objects published by the set of sources during the target time window. More specifically, the computer system can generate a manifest of users based on a set of user containers storing attributes—represented in objects published by the set of sources during the target time window—exhibited by users during the target time window.

In another implementation, the computer system interfaces with an operator via an operator portal: to receive selection of a subset of sources of interest (e.g., between one and five sources, inclusive); and to generate a visualization representing unique users for which each of these selected sources is generating objects during the target time interval.

In this implementation, the operator portal: renders a menu (e.g., a dropdown menu, a list) of sources designated in the security policy within an operator interface; and prompts the operator to select sources of interest from the menu. The computer system and the operator portal can generate visualizations (e.g., one-set, two-set, three-set, four-set, five-set, etc. Venn diagrams) depicting quantities of unique users—currently (or recently) connected to the computer network—for which combinations of sources of interest are currently generating objects, which can include corresponding lists or tables including user identifiers, the endpoint devices, MAC address, operating system, IP address(es), username(s), email address(es), first name(s), last name(s), phone number(s), group(s), and/or time of last inbound or outbound transmission detected by the sources, etc. for each user represented by selected combinations of sources of interest.

The computer system and the operator portal can also update the visualization in response to de-selection of a source of interest, selection of an alternate source of interest, selection (or de-selection) of a particular user attribute, selection (or de-selection) of a particular application attribute, and/or selection (or de-selection) of a particular endpoint device attribute.

Additionally, if the operator selects a particular user from this list or table, the computer system and the operator portal can: extract additional attributes of this particular user previously derived from corresponding user containers and stored in the manifest; and present these attributes to the operator via the operator interface. Alternatively, the computer system and the operator portal can: retrieve a set of user containers—associated with one or more security technologies—representing this particular user; extract single-point and/or timeseries data from these user containers; and present these data to the operator via the operator portal.

More specifically, as shown in FIG. 2, in response to selection of a first user in the manifest of users at the operator portal, the computer system can: generate a visualization representing a set of attributes exhibited by the first user during the target time interval in Block S130; and render the visualization at the operator portal in Block S132.

For example, the computer system can generate the visualization representing: an activity status (e.g., an active status, an inactive status) of the first user during the target time interval; and a set of endpoint devices associated with (e.g., accessed by, logged in to) the first user during the target time interval.

In this example, in response to the inactive status of the first user during the first time interval, for each source in the set of sources, the computer system can: generate a command to remove the first user (e.g., an account corresponding to the first user) from the source in Block S120; and transmit the command to the source in Block S122.

Accordingly, the system can: detect a subset of inactive users based on objects generated by the set of sources; and issue commands—to the set of sources—to remove (or delete) the subset of inactive users from the set of sources. Therefore, the computer system can simplify user management within these sources by removing stale and/or irrelevant user data.

Additionally, the computer system and the operator portal can extract and present attributes including: a name of the user; a login username; an employee number; a number of sources (e.g., security technologies, non-security technologies) associated with the user; user activity; a user role; an organization of which the user is a part; a group of which the user is a member; an email address; a geolocation; device information (e.g., device name, operating system, MAC address, IP address) corresponding to the set of endpoint devices associated with the user; a password; and a date/time of last password change.

5.1.1 Fire Source Selection

In this implementation, when the operator selects a first source of interest, the computer system queries the user manifest for a first quantity of unique user identifiers labeled with the first source of interest. The operator portal then: renders a first circle (or other closed curve) within the operator interface; and annotates the first circle with the first quantity of unique user identifiers labeled with the first source of interest. More specifically, once the operator selects the first source of interest, the operator portal can render a single-set Venn diagram depicting a quantity of unique users for which the first source of interest generates objects (or represents in objects).

Subsequently, when the user selects the interior of the first circle, the operator portal can populate a list or table of attributes of these users for which the first source of interest generates objects. For example, the operator portal can: generate a list or table including the activity status, and a set of associated endpoint devices for each user represented by the interior of the first circle (i.e., users for which the first source generates objects); and then render this list or table for the operator.

Furthermore, if the operator selects a particular user from this list or table, the operator portal can: extract additional attributes (e.g., a name of the user, a login username, an employee number, a user role, an organization of which the user is a part, a group of which the user is a member, an email address, a geolocation) of this particular user previously derived from corresponding user containers and stored in the manifest; and present these attributes to the operator via the operator interface.

5.1.2 Second Source Selection

Then, when the operator selects a second source of interest, the computer system can query the manifest for: a second quantity of unique user identifiers labeled with the second source of interest; and a first combined quantity of unique user identifiers labeled with both the first and second sources of interests. The operator portal can then: render a second circle (or other closed curve) intersecting the first circle within the operator interface; annotate the intersection of the first and second circles with the first combined quantity of unique user identifiers labeled with the first and second sources of interest; annotate a section of the first circle disjointed from the second circle with a difference between the first quantity and the first combined quantity; and annotate a section of the second circle disjointed from the first circle with a difference between the second quantity and the first combined quantity.

Therefore, the operator portal can render a two-set Venn diagram depicting: a first quantity of unique users for which the first source of interest is generating objects but for which the second source is not currently generating objects; a second quantity of unique users for which the second source of interest is generating objects but for which the first source is not currently generating objects; and a first combined quantity of unique users for which both the first and second sources of interest are generating objects.

Subsequently, when the operator selects the interior of the first circle disjoint from the second circle, the operator portal can: generate a first list or table including attributes (e.g., a name of the user, a login username, an employee number, an activity status, a set of endpoint devices associated with the user, an organization of which the user is a part, a group of which the user is a member, an email address, a geolocation) for each user represented by the section of the first circle disjointed from the second circle (i.e., users for which the first source is generating objects but for which the second source is not generating objects); and then render this first list or table within the operator interface. Similarly, when the operator selects the intersection of the first and second circles, the operator portal can: generate a second list or table including attributes for each user represented by the intersection of the first and second circles (i.e., users for which both the first and second sources are generating objects); and then render this second list or table within the operator interface.

5.1.2.1 Venn Diagram Example

In particular, as shown in FIG. 2, the computer system can implement methods and techniques described above to: identify a first subset of users, in the set of users, represented by objects generated by a first source in the set of sources and objects generated by a second source in the set of sources in Block S134 based on correspondence between fixed identifying data and variable status data in a first subset of user containers associated with the first source and the second source; and identify a second subset of users, in the set of users, represented by objects generated by the first source and excluded from objects generated by the second source in Block S136 based on absence of correspondence between fixed identifying data and variable status data in a second subset of user containers associated with the first source and the second source.

Then, in response to selection of the first source and the second source, the computer system can generate a visualization (e.g., a Venn diagram) representing: the first subset of users represented by objects generated by the first source and objects generated by the second source; and the second subset of users represented by objects generated by the first source and excluded from objects generated by the second source in Block S130.

In one example, in response to an operator selecting the first source and the second source at the operator portal, the computer system initializes a visualization that includes: a first area corresponding to the first source; and a second area corresponding to the second source and partially intersecting the first area. The computer system can also: annotate a first intersection of the first area and the second area in the visualization with a first representation (e.g., a first quantity) of users in the first subset of users represented by objects generated by the first source and objects generated by the second source; annotate the first area—outside of the second area—in the visualization with a second representation (e.g., a second quantity) of users in the second subset of endpoint devices represented by objects generated by the first source but omitted in objects generated by the second source; and render the visualization within the operator portal.

In this example, the computer system can also: link the first intersection in the visualization to identifiers of the first subset of users; and link the first area—outside of the second area—in the visualization to identifiers of the second subset of users. Then, in response to the operator selecting the first intersection in the visualization, the operator portal can render a first list of identifiers of the first subset of users. Accordingly, in response to selection of a first identifier—from this first list of identifiers that represents the first subset of users—the operator portal can: retrieve a composite endpoint device container containing fixed identifying and variable status data aggregated from the first and second sources and associated with the first identifier; and present these data—which represent the first user during the currently time interval—to the operator.

The computer system and the operator portal can repeat this process for other combinations of sources selected by the operator.

Accordingly, the computer system and the operator portal can: identify a subset of users (i.e., the second subset of users) represented in objects generated by one source but omitted from objects generated by another source; and expose this particular subset of users to the operator. Therefore, the operator can investigate this particular subset of users and/or reconcile these users across sources, as described below.

5.1.2.2 Additional Actions

In one implementation, in response to identifying the second subset of users represented by objects generated by the first source and excluded from objects generated by the second source, the computer system can access a subset of user containers corresponding to the second subset of users in Block S138. For each user container in this subset of user containers, the computer system can: generate a tag representing a conflict between a user corresponding to the user container, the first source, and the second source in Block S140; and compile the tag into the user container in Block S142.

For example, in response to identifying a first user—in the second subset of users—represented by objects generated by the first source and excluded from objects generated by the second source, the computer system can: access a first user container corresponding to the first user; generate a first tag representing a conflict between the first user, the first source, and the second source; and compile the tag into the first user container.

In another implementation, the computer system can: generate a notification to selectively investigate the second subset of users based on the tag in Block S144; and serve the notification at a device associated with security personnel affiliated with the computer network in Block S146. More specifically, the computer system can: query the manifest for tag; identify a subset of users based on the tag stored in user containers corresponding to this subset of users; and generate the notification to selectively investigate this subset of users.

Additionally or alternatively, the computer system can: generate a command (or a set of commands) to add the second subset of users at the second source in Block S128; and transmitting the command to the second source in Block S130. More specifically, the computer system can generate the command including attributes for each user in the second subset of users.

Accordingly, by generating and transmitting this command to the second source, the computer system can instruct the second source to generate objects representing users in the second subset of users in a next time interval. Therefore, the computer system can ensure that each source accurately represents every unique user affiliated with the computer network as designated by the security policy.

5.1.3 Additional Source Selections

The computer system and the operator portal can implement similar methods and techniques to generate three-set, four-set, five-set, etc. Venn diagrams depicting quantities of unique users—currently (or recently) connected to the computer network—for which combinations of sources of interest are currently generating objects. The operator portal can also implement similar methods and techniques to update the visualization in response to de-selection of a source of interest and/or selection of an alternate source of interest.

5.1.4 Other Filters

In one variation, the operator portal: renders a secondary menu of user attributes (e.g., user identifiers, endpoint devices accessed by the user, endpoint devices assigned to the user, IP address(es), username(s), email address(es), first name(s), last name(s), phone number(s), group(s)); and prompts or enables the operator to select an attribute from this secondary menu. Then, in response to the operator selecting a particular user attribute, the operator portal can: add a region (e.g., a circle) representing this particular attribute to the visualization; query the manifest for quantities of users that include and exclude this particular attribute and for which selected sources of interest—currently selected by the operator—are and are not generating objects; and populate the visualization with these quantities.

Therefore, in this variation, the operator portal can generate and render a visualization that reflects combinations of: one or more sources of interest; and one or more attributes representative of users affiliated with the computer network during the target time interval.

Alternatively, the operator portal (and/or the computer system) can: filter the manifest by a particular user attribute selected by the operator; and generate and render a visualization that reflects combinations of one or more sources of interest for all users—affiliated with the computer network during the target time interval—that match the particular user attribute thus selected by the operator.

5.1.5 Anomalous Device Access Example

Figure 6B:
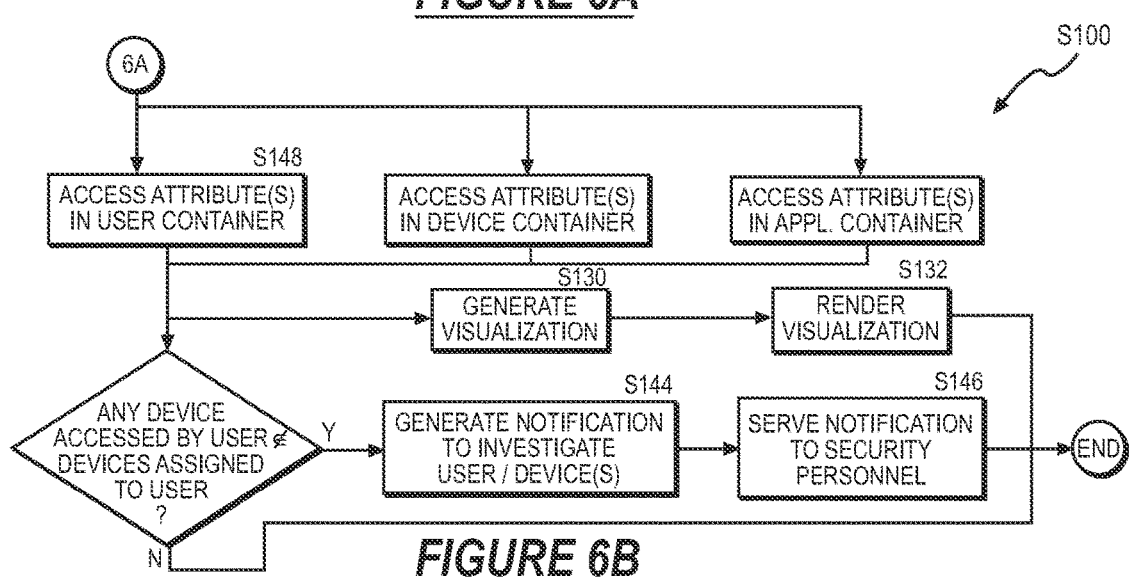

In one implementation, as shown in FIG. 6B, in response to selection of a first user in the manifest of users at the operator portal, the computer system can generate a visualization representing: an activity status (e.g., an active status, an inactive status) of the first user during the target time interval; and a first set of endpoint devices associated with (e.g., accessed by, logged in to) the first user during the target time interval.

In another implementation, in response to selection of an attribute—representing a second set of endpoint device assigned to the first user during the target time interval—at the operator portal, the computer system can access an attribute, defined in a first user container corresponding to the first user (and/or defined in the user manifest), representing a second set of endpoint devices assigned to the first user during the target time interval in Block S148.

Additionally or alternatively, the computer system can access a policy defining the second set of endpoint devices assigned to the first user during the target time interval.

In this implementation, in Block S130, the computer system can generate a visualization by: initializing the visualization including a first area corresponding to the first set of endpoint devices associated with the first user during the target time interval and a second area corresponding to the second subset of endpoint devices and partially intersecting the first area; and annotating the first area, outside of the second area, with a representation of a subset of endpoint devices (e.g., a first endpoint device) associated with the first user during the target time interval but not assigned to the first user during the target time interval. The computer system can render the visualization at the operator portal in Block S132.

Additionally, the computer system can generate the visualization further representing a set of attributes (e.g., a device name, a MAC address, an operating system, an IP address) for each endpoint device in the first set of endpoint devices, the second set of endpoint devices, and/or the subset of endpoint devices.

Accordingly, the computer system and the operator portal can: expose the subset of endpoint devices—accessed by the first user but not assigned to the first user during the target time interval—as an anomalous subset of endpoint devices to the operator. Therefore, the operator may selectively investigate the first user and/or endpoint devices in this anomalous subset of endpoint devices.

Additionally or alternatively, in response to the first set of endpoint devices—associated with the first user during the target time interval—including a first endpoint device that is excluded from the second set of endpoint devices assigned to the first user during the target time interval, the computer system can: generate a notification to selectively investigate the first user and/or the first endpoint device in Block S144; and serve the notification to a device associated with security personnel affiliated with the computer network in Block S146.

5.2 Real-Time Software Inventory Visualization

Blocks of the method S100 recite, in response to selection of the first application at an operator portal: generating a visualization representing a first subset of endpoint devices, in the set of endpoint devices, on which the first application is installed during the first time interval based on a first set of attributes, exhibited by the first application during the first time interval, contained in the first application container in Block S130; and rendering the visualization at the operator interface in Block S132.

The computer system and the operator portal can implement similar methods and techniques described above to generate visualizations (e.g., one-set, two-set, three-set, four-set, five-set, etc. Venn diagrams) depicting quantities of unique software applications—currently (or recently) installed or accessed on endpoint devices connected to the computer network—for which combinations of sources of interest are currently generating objects, which can include corresponding lists or tables including attributes for each application represented by selected combinations of sources of interest.

The computer system and the operator portal can also implement similar methods and techniques to update the visualization in response to de-selection of a source of interest, selection of an alternate source of interest, selection (or de-selection) of a particular application attribute, selection (or de-selection) of a particular user attribute, and/or selection (or de-selection) of a particular endpoint device attribute.

Additionally, if the user selects a particular application from this list or table, the computer system and the operator portal can: extract additional attributes of this particular application previously derived from corresponding application containers and stored in the manifest; and present these attributes to the operator via the operator interface. Alternatively, the operator portal can: retrieve a set of application containers—associated with one or more sources—representing this particular application; extract single-point and/or timeseries data from these application containers; and present these data to the operator via the operator interface. For example, the computer system and the operator portal can extract and present attributes including: a name of the application; a version and/or patch level of the application; manufacturer (or vendor) of the application; a number of sources (e.g., security technologies, non-security technologies) reporting the application; a set of devices on which the application is installed; a set of devices on which the application is accessed; device information (e.g., device name, operating system, MAC address, IP address, geolocation, installation time, access time, access duration) corresponding to the set of devices on which the application is installed/accessed; a set of users by which the application is installed and/or accessed; user information (e.g., name of user, login username, email address, access time, access duration, user group, user role, geolocation, license identifier) corresponding to the set of users by which the application is installed/accessed; user activity; a set of licenses associated with the application (e.g., total number of available license instances for the application, total number of license instances used); a set of known (and/or reported) vulnerabilities associated with the application; a set of mitigations corresponding to the set of known vulnerabilities; and/or a set of tags associated with the application.

More specifically, as shown in FIG. 4, in response to selection of a first application in the manifest of applications at an operator portal, the computer system can: generate a visualization representing a first set of attributes exhibited by the first application during the target time interval in Block S130; and render the visualization at the operator interface in Block S132.

For example, the computer system can generate the visualization representing a first attribute representing a subset of endpoint devices (e.g., the first endpoint device) on which the first application is installed during the first time interval.

Accordingly, the computer system and the operator portal can expose every unique endpoint device on which the first application is installed. Therefore, in response to identifying the first application as an unauthorized and/or vulnerable application, the computer system and the operator portal can aid the operator by identifying these unique endpoint devices for investigation and/or remediation.

5.2.1 Unauthorized Application Example

In one implementation, in response to selection of a first application in the manifest of applications at the operator portal, the computer system can generate a visualization representing a first attribute representing a first set of endpoint devices on which the first application is installed during the first time interval.

Figure 7B:
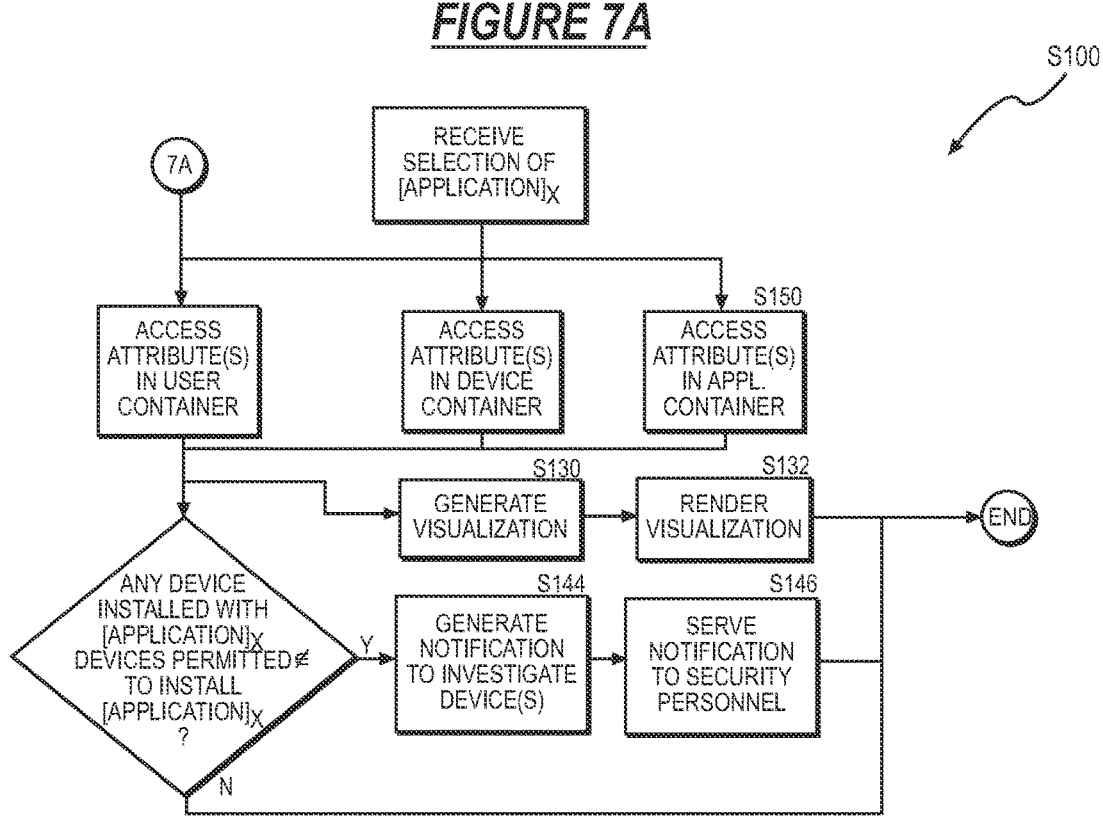

In another implementation, as shown in FIG. 7B, in response to selection of a second attribute—representing a second set of endpoint devices permitted to install the first application during the target time interval—at the operator portal, the computer system can access this second attribute defined in a first application container corresponding to the first application (and/or defined in the application manifest) in Block S150.

Additionally or alternatively, the computer system can access a policy defining the second set of endpoint devices permitted to install the first application during the target time interval.

In this implementation, in Block S130, the computer system can generate a visualization including: a first area corresponding to the first set of endpoint devices on which the first application is installed during the target time interval; and a second area—corresponding to the second subset of endpoint devices permitted to install the first application during the target time interval—partially intersecting the first area. The computer system can annotate the first area, outside of the second area, with a representation of a subset of endpoint devices including the first application (e.g., on which the first application is installed) and excluded from the second set of endpoint devices during the target time interval. The computer system can render the visualization at the operator portal in Block S132.

In another implementation, in response to identifying the subset of endpoint devices on which the first application is installed and excluded from the second set of endpoint devices, the computer system can generate a notification to selectively investigate this subset of endpoint devices based on the first application in Block S144; and serve the notification to a device associated with security personnel affiliated with the computer network in Block S146.

Additionally or alternatively, for each endpoint device in the subset of endpoint devices on which the first application is installed and excluded from the second set of endpoint devices, the computer system can: generate a command (or a set of commands) to uninstall the first application from the endpoint device in Block S120; and serving the command to the endpoint device in Block S122.

5.2.2 Application Permissions by User Group

In one variation, as shown in FIG. 5, the computer system can access a set of user containers in Block S152, each user container, in the set of user containers: representing a user in the first subset of users; and including an attribute representing a group to which the user is assigned during the first time interval.

In this variation, based on the first application container—corresponding to the first application—and the set of user containers, the computer system can: identify a second subset of endpoint devices, in a first subset of endpoint devices on which the first application is installed, assigned to a second subset of users, in the first subset of users, assigned to a first group exhibiting permission associated with the first application in Block S154; and identify a third subset of endpoint devices, in the first subset of endpoint devices, assigned to a third subset of users, in the first subset of users, assigned to a group absent permission associated with the first application in Block S156.

Additionally, in Block S130, the computer system can generate a visualization representing: the second subset of endpoint devices, on which the first application is installed, assigned to the second subset of users assigned to the first group exhibiting permission associated with the first application; and the third subset of endpoint devices, on which the first application is installed, assigned to the third subset of users assigned to the group absent permission associated with the first application.

More specifically, the computer system can initialize the visualization including: a first area corresponding to the first subset of endpoint devices; and a second area corresponding to the second subset of endpoint devices and partially intersecting the first area. The computer system can then: annotating the first area, outside of the second area, with a representation of the third subset of endpoint devices; and render the visualization at an operator portal.

Furthermore, in Block S138, the computer system can access a subset of user containers corresponding to the third subset of users assigned to the group absent permission associated with the first application. Then, for each user container in the subset of user containers, the computer system can: generate a tag associating a user, represented by the user container, with the first application and absence of permission associated with the first application in Block S140; and compile the tag in the user container in Block S142.

Additionally or alternatively, for each endpoint device in the third subset of endpoint devices assigned to the third subset of user assigned to the group absent permission associated with the first application, the computer system can: generate a command to uninstall the first application from the endpoint device in Block S158; and serve the command to the endpoint device in Block S160.

Accordingly, the computer system can: identify a subset of endpoint devices on which the first application is installed and assigned to users that are members of a group(s) absent permission associated with the first application; prompt security personnel to selectively investigate these endpoint devices and users; and/or execute actions to remove the first application from this subset of endpoint devices. Therefore, the computer system can enforce a security policy defining permission for the first application that is allocated to a particular user group(s).

5.3 Search

In one variation, the operator portal can also interface with the operator to receive multiple application, user, and/or device search terms, such as, "[Which application] was [accessed within the last 30 days] on [any device] [not running security technology X] [within the last 30 days]."

Because the computer system links the manifest(s), the endpoint device containers, and the application containers as described above, the computer system can then scan the manifest(s), the endpoint device containers, the user containers, and/or the application containers for these values and return a list of unique endpoint devices, unique users, and/or unique applications that fulfill each of these terms. The operator portal can then present this list to the operator.

In one example, the operator portal can interface with the operator to receive multiple application and/or device search queries for specific versions of applications known to be defective and/or vulnerable to attack. The computer system can then scan the manifest(s), the endpoint device containers, and/or the application containers for these values and return a list of unique endpoint devices and/or unique applications that match these specific versions of applications. The operator portal can then present this list to the operator.

In particular, the computer system can generate the list to include a first entry representing a first application instance known to exhibit vulnerabilities. The computer system and operator portal can extract and present application attributes including: a name of the application; a version and/or patch level of the application; manufacturer (or vendor) of the application; a manufacturer (or vendor) of the application; a set of known (and/or reported) vulnerabilities associated with the application; and/or a set of mitigations corresponding to the set of known vulnerabilities.

Additionally, the computer system and operator portal can extract and present attributes including: a set of devices on which the application is installed; a set of devices on which the application is accessed; device information (e.g., device name, operating system, MAC address, IP address, geolocation, installation time, access time, access duration) corresponding to the set of devices on which the application is installed/accessed; a set of users by which the application is installed and/or accessed; and/or user information (e.g., name of user, login username, email address, access time, access duration, user group, user role, geolocation, license identifier) corresponding to the set of users by which the application is installed/accessed.

Accordingly, the computer system can: associate a set of devices with an application known to exhibit vulnerabilities; flag the set of devices for inspection or monitoring; and/or increase a risk level associated with individual devices in the set of devices. Similarly, the computer system can: associate a set of users with an application known to exhibit vulnerabilities; flag the set of users for inspection or monitoring; and/or increase a risk level associated with individual users in the set of users. Therefore, the computer system can identify specific devices and/or users as points of risk to perform corrective action.

5.3.1 Vulnerable Application Example

In one implementation, the computer system can access a set of objects, generated by a set of sources during a first time interval, representing attributes of a set of assets (e.g., a first set of endpoint devices, a first set of applications) affiliated with a computer network. More specifically, the computer system can access a first object, generated by a first source in the set of sources, defining an attribute representing a vulnerability exhibited by the first application. Based on application identifying data, the computer system can partition the set of objects into a set of object groups including a first object group—including the first object—representing the first application during the first time interval.

In this implementation, the computer system can aggregate attributes represented in objects in the first object group into a first application container representing the first application. For example, the computer system can aggregate the attribute—representing a vulnerability exhibited by the first application—into the first application container.

Figure 7C:
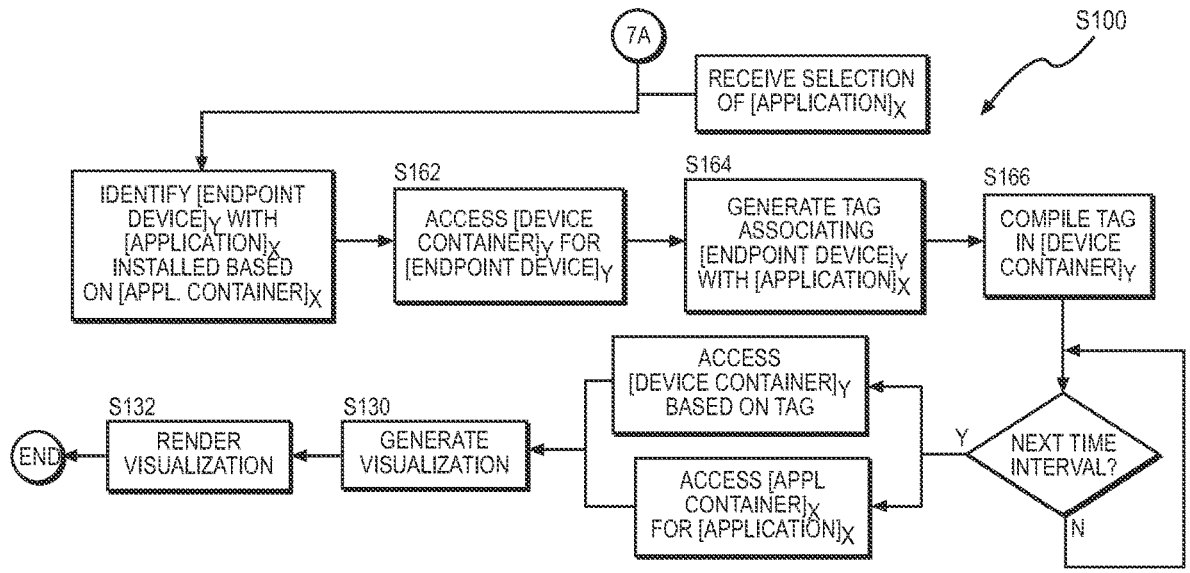

In another implementation, as shown in FIG. 7C, in response to selection of the first application in the first manifest of applications at the operator portal, the computer system can: identify a set of endpoint devices on which the first application is installed during the first time interval; and access a subset of endpoint device containers in Block S162, each endpoint device container in the subset of endpoint device containers including fixed identifying data and variable status data representing an endpoint device in the subset of endpoint devices. Then, for each endpoint device container in the subset of endpoint device containers, the computer system can: generate a tag associating a corresponding endpoint device with the first application in Block S164; and compile the tag in the endpoint device container in Block S166. For example, the computer system can generate the tag associating the corresponding endpoint device with the vulnerability exhibited by the first application.

Then, the computer system can: access a second set of objects, generated by the set of sources during a second time interval succeeding the first time interval, representing attributes of a second set of assets (e.g., a second set of endpoint devices, second set of applications including the first application) affiliated with the computer network in Block S102; partition the second set of objects into a second set of object groups including a second object group representing the first application during the second time interval in Block S106; and aggregate attributes represented in objects in the second object group into the first application container in Block S108.

In one implementation, based on the first application container and the subset of endpoint device containers including the tag associating an endpoint device with the vulnerability exhibited by the first application, the computer system can generate a visualization in Block S130 by initializing the visualization including: a first area corresponding to the first subset of endpoint devices associated with the tag; and a second area corresponding to a second set of endpoint devices, on which the first application is installed during the second time interval, and partially intersecting the first area.

In this implementation, the computer system can annotate the first area—outside the second area—with a first representation (e.g., a first quantity) of a first subset of endpoint devices, in the second set of endpoint devices, associated with the tag and absent the first application during the second time interval. The computer system can access endpoint device containers corresponding to this first subset of endpoint devices and remove the tag from these endpoint device containers.

Additionally, the computer system can annotate the first area—intersecting the second area—with a second representation (e.g., a second quantity) of a second subset of endpoint devices, in the second set of endpoint devices, associated with the tag and on which the first application is installed during the second time interval. The computer system can: generate a notification to selectively investigate this second subset of endpoint devices; and serve the notification to a device associated with security personnel affiliated with the computer network.

Accordingly, the computer system can track deployment (and removal) of a vulnerable application on endpoint devices of the computer network across time intervals. Therefore, the computer system can: identify endpoint devices including the vulnerable application installed thereon; and prompt security personnel and/or users assigned to these endpoint devices to uninstall or remove the vulnerable application.

6. Security Policy

In one variation, the computer system can: access a security policy that defines rules for users; compare these rules to user attributes recorded in the current manifest; detect differences between these rules and attributes of individual users (or groups, clusters of users); and selectively prompt security personnel to investigate these users. In one example, in response to identifying a particular user that deviates from a rule contained in the security policy, the computer system can prompt security personnel to: investigate the particular user and/or an endpoint device(s) associated with the particular user; push a systems or security technology update to the endpoint device(s); or limit account or user permissions until the security policy is fulfilled. In another example, in response to detecting a time/date of last password change for a user exceeds a threshold, the computer system can generate and serve a prompt to an endpoint device associated with the user requiring a password update.

In one implementation, the computer system can: categorize a user as a VIP user based on one or more user attributes (e.g., access to sensitive data, access to billing or monetary accounts, access to customers); and prioritize investigation and/or correction in response to detecting the VIP user deviates from the security policy. For example, in response to detecting a time/date of last password change of the VIP user exceeds a threshold, the computer system can: generate and serve a prompt to an endpoint device associated with the VIP user requiring a password update; and remove permissions (e.g., access to sensitive data, access to billing or monetary accounts, access to customers) until the password update is completed.

Additionally, the computer system can implement similar methods and techniques: to access a security policy that defines rules for a set of applications installed and/or accessed on respective endpoint devices connected to the network; to compare these rules to application characteristics recorded in the current manifest; to detect differences between these rules and characteristics of individual applications (or groups, combinations of applications); and selectively prompt security personnel to investigate these applications. In one example, in response to identifying a particular application that deviates from a rule contained in the security policy (e.g., a version of the particular application is an out-of-date version of the particular application, a version of the particular application is known (or reported) to have vulnerabilities, the particular application is unauthorized for access), the computer system prompts security personnel: to investigate the particular application, a user(s) accessing the particular application, and/or an endpoint device(s) associated with the particular application; to push a systems or security technology update to the endpoint device(s); or to limit account or user permissions until the security policy is fulfilled.

6.1 Software Profiles

Generally, the computer system can access a security policy that defines rules for combinations of applications installed on endpoint devices connected to the computer network.

In one implementation, the computer system can implement a software profile defining a minimum required combination of applications installed on an endpoint device. Additionally, the computer system can implement a software profile further defining a minimum required version, patch level, and/or configuration for each application in the combination of applications.

For example, the computer system can implement a software profile defining: a minimum required combination of applications including an operating system, a set of productivity tools (e.g., word processor, document reader, Internet browser), a set of communication tools (e.g., workplace communication tool, email client), and a set of security tools (e.g., malware tool); and a minimum required version of each application in the combination of applications.

In another implementation, the computer system can implement a set of software profiles, each software profile in the set of software profiles defining a different minimum required combination of applications and/or different minimum required version(s) of each application in the combination of applications. In particular, the computer system can implement the set of software profiles, each software profile corresponding to a respective device type in a set of device types and/or a respective user type in a set of user types.

6.1.1 Software Profiles Based on User Type

Similarly, in another implementation, the computer system can implement a set of software profiles, each software profile in the set of profiles: corresponding to a different user type in a set of user types (e.g., executive, manager, employee, intern, engineer, accountant, attorney, human resources representative); and defining a minimum required combination of applications installed on an endpoint device associated with a user characterized by the user type. Additionally, the computer system can implement each software profile to further define a minimum required version, patch level, and/or configuration for each application in each required combination of applications.

In particular, the computer system can implement each software profile defining a minimum required combination of applications based on an expected requirement of a user type for the minimum required combination of applications.

For example, the computer system can implement a first software profile corresponding to a first user type, such as an executive, and defining a first minimum required combination of applications installed on an endpoint device associated with a user characterized by the first user type. In particular, the computer system can implement the first software profile defining the first minimum required combination of applications based on an expected requirement of the first user type for the first minimum combination of applications. In this example, a user of the first user type (i.e., executive) may require an accounting application. The computer system can thus implement the first software profile defining the first minimum required combination of applications including a first operating system, a first set of productivity tools (e.g., word processor, document reader, Internet browser, accounting application), a first set of communication tools (e.g., workplace communication tool, email client), and a first set of security tools (e.g., malware tool).

The computer system can also implement a second software profile corresponding to a second user type, such as an engineer, and defining a second minimum required combination of applications installed on an endpoint device associated with a user characterized by the second user type. In particular, the computer system can implement the second software profile defining the second minimum required combination of applications based on an expected requirement of the second user type for the second minimum combination of applications. In this example, a user of the second user type (i.e., engineer) may require a CAD application, but may not require an accounting application. The computer system can implement the second software profile defining the second minimum required combination of applications including a second operating system, a second set of productivity tools (e.g., word processor, document reader, Internet browser, CAD application), a second set of communication tools (e.g., workplace communication tool, email client), and a second set of security tools (e.g., malware tool).

In this example, the computer system can implement the first software profile and the second software profile including the same operating system, the same set of communication tools, and the same set of security tools in respective minimum required combinations of applications. However, the computer system can implement the first software profile and the second software profile including a different set of productivity tools in each software profile based on expected requirement of a user type.

Accordingly, the computer system can thus: ensure appropriate combinations of applications are installed on endpoint devices associated with users requiring these applications; and prevent over-provisioning of applications on endpoint devices associated with users who may not require these applications, thereby optimizing application license utilization across enterprise resources.

6.2 Software Profile Enforcement

Figure 7D:
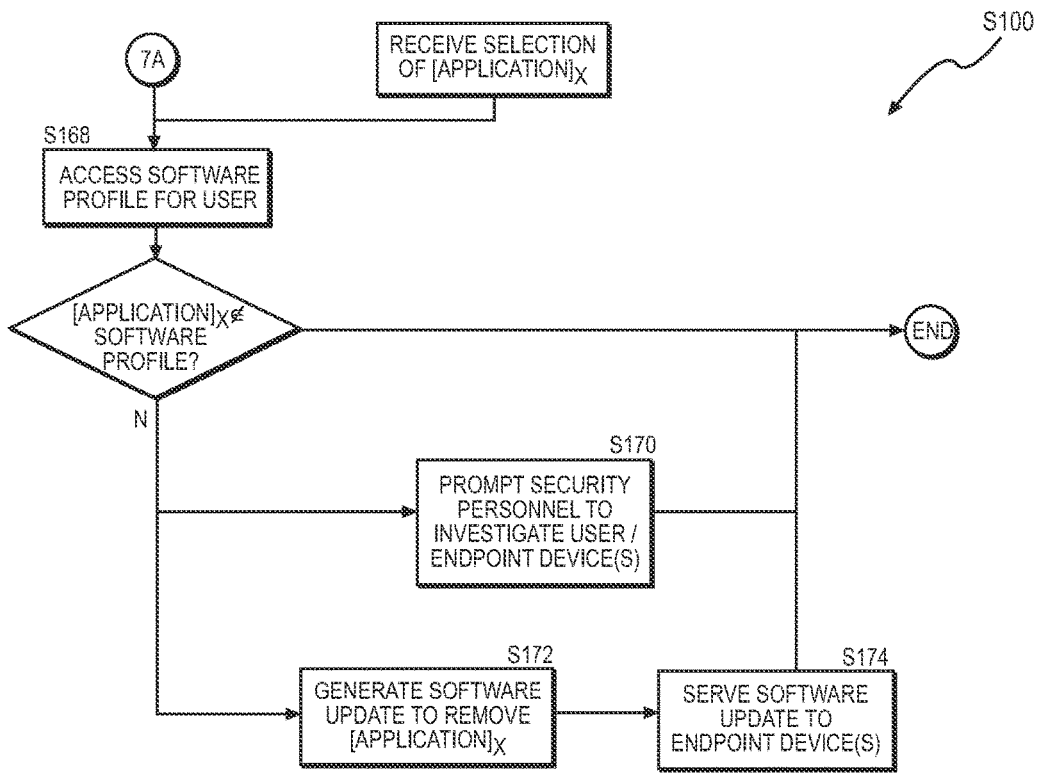

In one implementation, as shown in FIG. 7D, the computer system can access a software profile corresponding to a user in Block S168. More specifically, the computer system can access a software profile corresponding to a user assigned to an endpoint device on which a particular application is installed.

In this implementation, in response to the software profile excluding the particular application, the computer system can selectively prompt security personnel to investigate the user and/or the endpoint device in Block S170. Additionally or alternatively, the computer system can: generate a software update to remove the particular application from the endpoint device in Block S172; and serve the software update to the endpoint device in Block S174.

In another implementation, the computer system can: access a security policy that defines a software profile, the software profile defining a minimum required combination of applications installed on an endpoint device; compare the software profile to application attributes recorded in the current manifest; and detect differences between the software profile and attributes representing combinations of applications on a set of endpoint devices. In response to detecting a difference between the software profile and a combination of applications on a particular endpoint device in the set of devices, the computer system can selectively prompt security personnel to investigate this combination of applications and/or the particular endpoint device. In particular, the computer system can generate and serve an inspection list to security personnel, the inspection list including: endpoint devices exhibiting a combination of applications falling below the minimum required combination of applications; and endpoint devices exhibiting a combination of applications exceeding the minimum required combination of applications. The computer system can also push an update to the endpoint device(s) to reconcile the difference.

For example, the computer system can access a security policy including a software profile, the software profile defining: a minimum required combination of applications including an operating system, a set of productivity tools (e.g., word processor, document reader, Internet browser), a set of communication tools (e.g., workplace communication tool, email client), and a set of security tools (e.g., malware tool); and a minimum required version of each application in the combination of applications. In this example, the computer system can then: compare the software profile to application characteristics recorded in the current manifest; and detect differences between the software profile and attributes representing combinations of applications on a set of endpoint devices. More specifically, the computer system can detect an absence of a malware tool, defined in the first software profile, from a set of applications installed on a first endpoint device in the set of endpoint devices. In response to detecting the absence of the malware tool from the set of applications installed on the first endpoint device, the computer system can push an update to the first endpoint device to install the malware tool on the first endpoint device.

In one variation, the computer system can: access a security policy that defines a set of software profiles, each software profile in the set of software profiles corresponding to a different device type in a set of device types and/or a different user type in a set of user types. The computer system can: compare the set of software profiles to a combination of application attributes, device attributes, and/or user attributes recorded in the current manifest; and detect differences between the set of software profiles and the combination of attributes.

In particular, the computer system can detect differences between a software profile corresponding to a user type in the set of user types and attributes representing a combination of applications installed on an endpoint device associated with a user characterized by a particular user type in the set of user types. In response to detecting a difference between the software profile and attributes representing a combination of applications on a particular endpoint device, in the set of devices, associated with a user characterized by the particular user type, the computer system can: selectively prompt security personnel to investigate this combination of applications, the particular endpoint device, and/or the user; and push an update to the particular endpoint device to reconcile the difference.

Additionally or alternatively, the computer system can detect differences between a software profile corresponding to a device type in the set of device types and attributes representing a combination of applications installed on an endpoint device characterized by a particular device type in the set of device types. In response to detecting a difference between the software profile and a combination of applications on a particular endpoint device, in the set of devices, characterized by the particular device type, the computer system can: selectively prompt security personnel to investigate this combination of applications and/or the particular endpoint device; and push an update to the particular endpoint device to reconcile the difference.

6.3 License Management

As described above, the computer system can identify a subset of endpoint devices, in a set of endpoint devices on a computer network, on which a first application is installed during a target time interval.

Figure 7E:
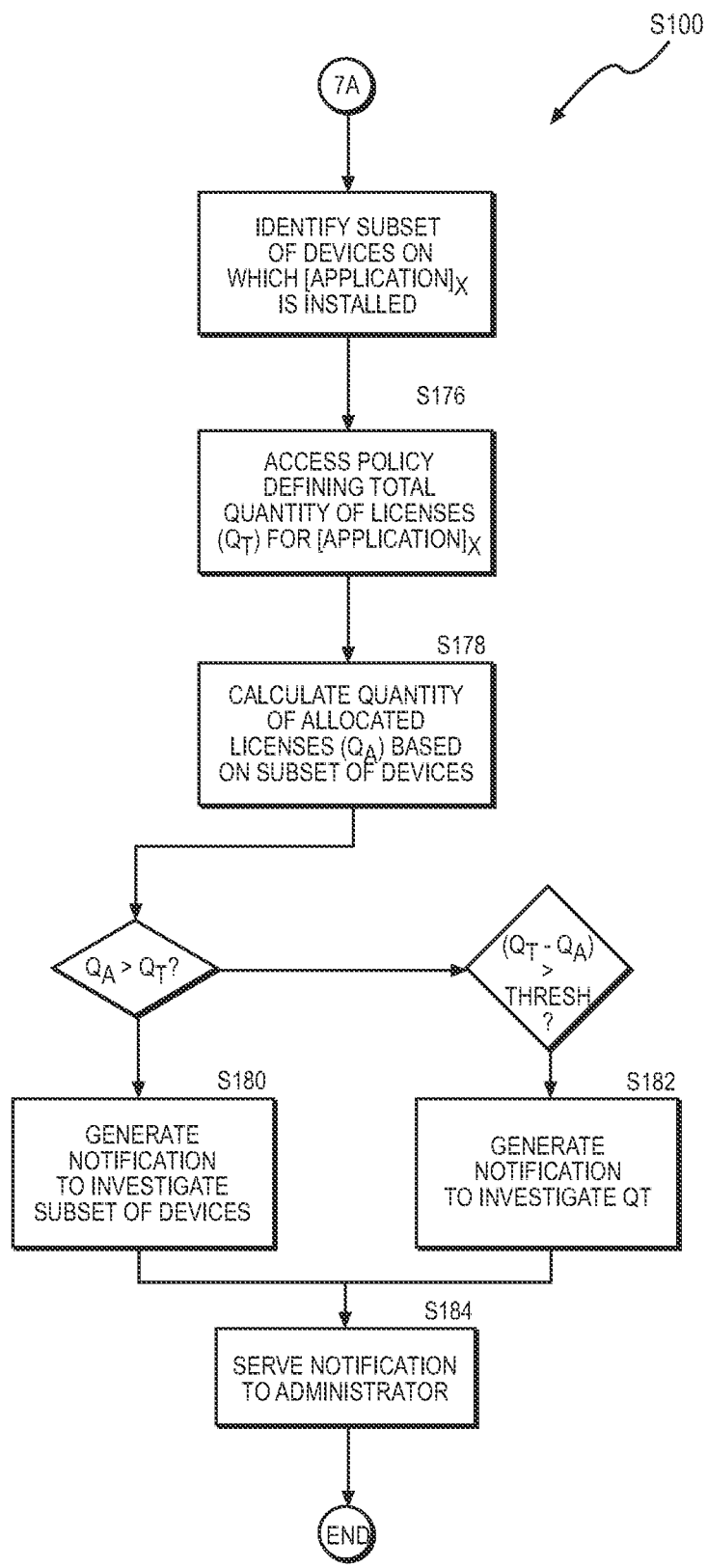

In one implementation, as shown in FIG. 7E, the computer system can: access a policy defining a first quantity of licenses associated with the first application (e.g., a total quantity of licenses available for the first application) in Block S176; and calculate a second quantity of allocated licenses—associated with the first application—based on the first subset of endpoint devices (e.g., a quantity of licenses corresponding to a quantity of endpoint devices in the first subset of endpoint devices) in Block S178.

In response to the second quantity exceeding the first quantity (e.g., representing an over-utilization of licenses for the first application), the computer system can: generate a notification to selectively investigate the first subset of endpoint devices in Block S180; and serve the notification to a device associated with an administrator affiliated with the computer network in Block S184.

In one variation, in response to second quantity falling below the first quantity, and in response to a difference between the second quantity and the first quantity exceeding a threshold quantity (e.g., representing an under-utilization of licenses for the first application), the computer system can: generate a notification to selectively investigate the first quantity of licenses associated with the first application in Block S182; and serve the notification to a device associated with an administrator affiliated with the computer network in Block S184.

Accordingly, the computer system can track allocation (e.g., over-utilization, under-utilization) of licenses for the application on endpoint devices of the computer network. Therefore, the computer system can aid security personnel and/or network administrators to optimize application license utilization across enterprise resources.

7. Correlation and Comparison

In another implementation, the computer system can execute Blocks of the method S100 by correlating and comparing a state and status of an object, a user, an application, or a device at two or more selected times. Generally, the computer system can correlate and compare a state and status of a set of users, all users, a set of applications, all applications, a set of devices, and/or all devices on the computer network at two or more selected times to generate a comprehensive and time-based characterization of the set of users, the set of applications, the set of devices, and the computer network. For example, the computer system can, for a user or a set of users, compare a first manifest derived from a first poll to a second manifest derived from a second poll. The computer system can then: compare first and second states and/or statuses of the user (or of a set of users) to detect time-based changes in the state and/or status of the user (e.g., a telemetry of the user or set of users); and generate notifications or prompts to investigate users or quarantine individual endpoint devices accordingly.

Generally, the computer system can compare a prior manifest to a current manifest in order to generate a real-time or near real-time representation of any change events occurring for a selected set of users and/or a selected set of devices on the computer network over a corresponding time period. Alternatively, the computer system can compare sets or groups of current and prior manifests to detect and/or determine large scale patterns of security policy compliance or non-compliance for the selected user(s), application(s) or device(s). Generally, a change event can include both changes of state (e.g., new employee, change of role, changing location, etc.) as well as changes of status (user login, user activity, changing IP addresses, etc.).

More specifically, the computer system can execute Blocks of the method S100 by, for each endpoint device connected to the computer network, detecting a change of state by comparing a first (current) manifest to a second (prior) manifest. As noted above, a change in status can include a user login, such as a user login at an endpoint device. For example, a prior manifest may indicate that a user logs into three endpoint devices (e.g., laptop provisioned to the user, personal mobile device, office printer). In this example, a current manifest may indicate that the user logs into ten endpoint devices (e.g., laptop provisioned to the user, personal mobile device, office printer, seven laptops provisioned to seven other users). Accordingly, the computer system can detect this change in status of the user, which may be against enterprise security policy, and perform corrective action, including: generating notifications or prompts to investigate the user; categorizing the user as "high risk"; revoking permissions from the user; and/or quarantining individual endpoint devices accordingly.

Generally, the computer system can execute Blocks of the method S100 to detect, determine, construct, and present changes in state or status that are indicative of a user-device relationship. Therefore, the computer system can detect changes in state or status for a user and, in response thereto, generate user behavior analytics that are indicative of a user's behavior vis-à-vis her device. For example, the computer system can generate a timeline of an endpoint device that may indicate that a user device experienced changes in access, authorization, or authentication technologies including for example: biometric or two-factor authentication enabled/disabled, additional/unknown users with administrative privileges on the endpoint device, or successive or repeated changes in a password or other authentication tool.

Likewise, the computer system can generate a timeline of an endpoint device that may indicate that a user device experienced repeated or successive IP address assignments, computer network accesses from disparate or undesirable locations, and/or computer network accesses at odd or off hours (e.g., non-work hours, weekends, holidays, etc.).

In one example implementation, the computer system can generate a timeline of an endpoint device that illustrates a complete history of the device from its initial provisioning into the computer network. Moreover, the computer system can generate a volatility model (e.g., rate of change of changes at the endpoint device) that is indicative of a potential user behavior security issue. For example, the computer system can determine from a series of successive manifests that a particular endpoint device has experienced a set of changes in state or status, and that timing of the set of changes is indicative of an accelerating pattern of behavior that poses a risk to the enterprise (e.g., because the user is exhibiting risky behaviors and/or because the endpoint device is malfunctioning or nearing its end of service).

7.1 Suspicious Device Access Example

As described above, the computer system can identify a subset of endpoint devices, in a set of endpoint devices on a computer network, associated with (e.g., accessed by) a particular user—such as a first user—during a target time interval, such as a first time interval.

In one implementation, the computer system can repeat this process to identify a second subset of endpoint devices, in a second set of endpoint devices on the computer network, associated with the first user during a subsequent time interval, such as a second time interval succeeding the second time interval.

For example, the computer system can: access a second set of objects, generated by the set of sources during a second time interval succeeding the first time interval, representing attributes of a second set of assets affiliated with the computer network, the second set of assets including a second set of endpoint devices and a second set of users including the first user; partition the second set of objects into a second set of object groups including a second object group representing the first user during the second time interval; and aggregate attributes represented in objects in the second object group into a first user container corresponding to the first user.

In this example, the computer system can generate a second manifest of users—including the first user—during the second time interval based on the set of user containers; and label the first user in the second manifest of users with a second set of attributes exhibited by the first user during the second time interval based on the first user container. More specifically, the computer system can label the second manifest with: a second activity status of the first user during the second time interval; and a second subset of endpoint devices, in the second set of endpoint devices, associated with the first user during the second time interval.

Figure 6C:
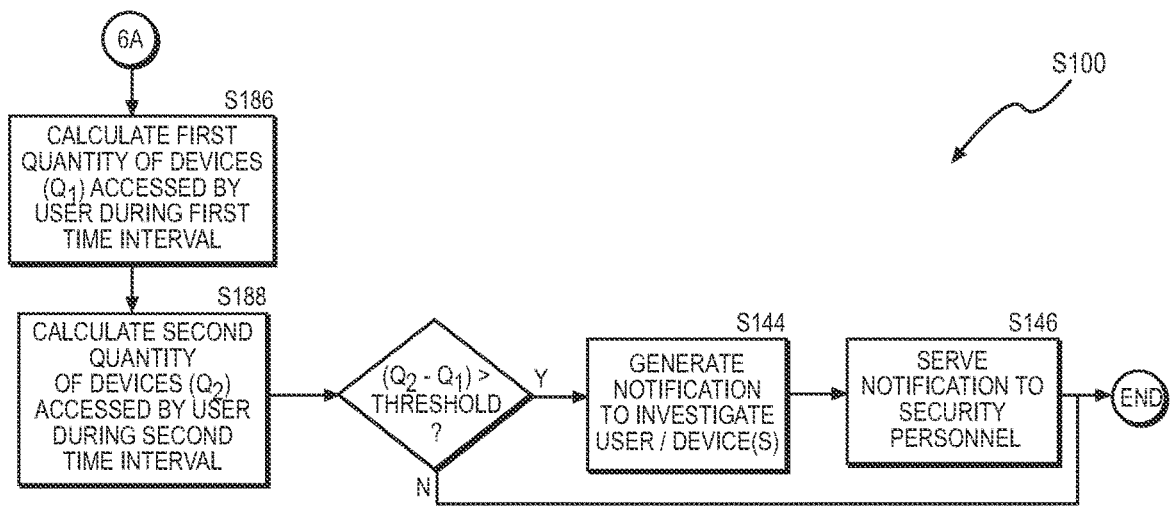

In another implementation, as shown in FIG. 6C, the computer system can: calculate a first quantity of endpoint devices in the first subset of endpoint devices associated with (e.g., accessed by) the first user during the first time period in Block S186; calculate a second quantity of endpoint devices in the second subset of endpoint devices in Block S188. In response to a difference between the second quantity and the first quantity exceeding a threshold quantity, the computer system can: generate a notification to selectively investigate the first user in Block S144; and serve the notification to a device associated with security personnel affiliated with the computer network in Block S146.

Accordingly, by detecting the difference between the second quantity and the first quantity exceeding the threshold quantity, the computer system can detect a suspicious behavior pattern exhibited by the user whose access credentials may have been compromised. Therefore, the computer system can rapidly expose gaps in security and execute remediation and/or mitigation techniques, such as notifying security personnel, adjusting permissions allocated to the first user, quarantining endpoint devices assigned to and/or accessed by the first user, etc.

7.2 Permissions Update Example

Figure 6D:
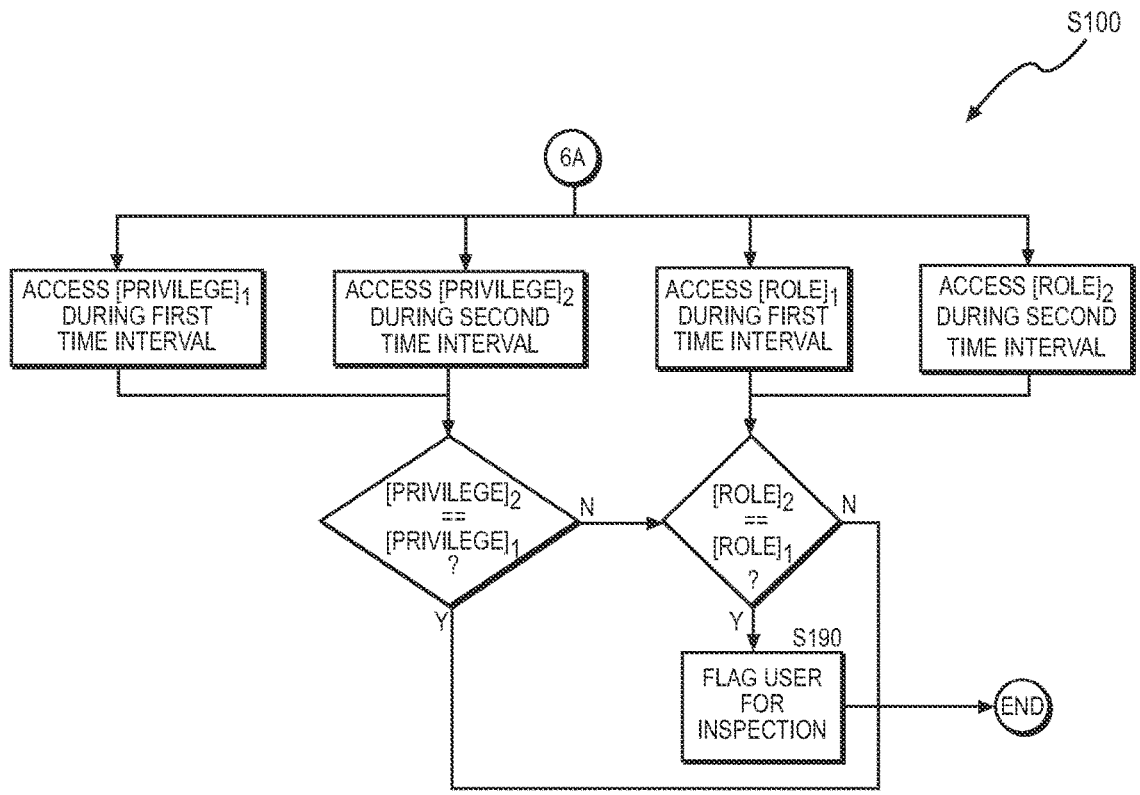

In one implementation, as shown in FIG. 6D, the computer system can detect changes in privileges assigned to a particular user across time intervals.

In this implementation, the computer system can execute methods and techniques described above: to access a first attribute representing a first role (e.g., staff engineer) assigned to the first user during a first time interval; to access a second attribute representing user-level privileges assigned to the first user during the first time interval; and to aggregate the first attribute and the second attribute into a first user container representing the first user.

Then, the computer system can execute methods and techniques described above: to access a third attribute representing the role assigned to the first user during a second time interval succeeding the first time interval; to access a fourth attribute representing administrator-level privileges assigned to the first user during the first time interval; and to aggregate the third attribute and the fourth attribute into the first user container.

In another implementation, in Block S190, the computer system can flag the first user for inspection in response to: the third attribute corresponding to the first attribute; and a difference between the fourth attribute and the second attribute.

Accordingly, the computer system can detect a change in privileges assigned to the first user from the first time interval to the second time interval (i.e., from user-level privileges to administrator-level privileges) while also detecting absence of change in role (e.g., staff engineer) assigned to the first user from the first time interval to the second time interval. Therefore, the computer system can prompt security personnel to inspect this change in privileges to ensure compliance with security policy and to prevent unintended and/or unnecessary extension of privilege to the first user given the first user's role.

7.3 Active/Inactive User Event

As described above, the computer system can label each user—identified in objects generated by a source during the current time interval—as active.

Furthermore, in response to absence of an object identifying a particular user—in any object generated by a source—for more than a threshold duration of time (e.g., one month), the computer system can relabel the user as inactive, which may indicate that the particular user is no longer connected to, affiliated with, or a risk to the computer network and/or the organization.

For example, in response to detecting presence of objects in a first set of objects—generated by security tools during a first time interval—identifying a first user, the computer system can label the first user as active during the current time interval in a user inventory list associated with the computer network. Later, in response to detecting absence of objects in a second set of objects—generated by security tools during a second time interval—containing characteristics identifying the first user and in response to the second time interval occurring within a threshold duration (e.g., between one and two months) of the first time interval, the computer system can relabel the first user as inactive during the second time interval in the user inventory list. Furthermore, in response to detecting absence of objects in a third set of objects—generated by security tools during a third time interval—containing characteristics identifying the first user and, in response to the third time interval occurring outside of the threshold duration of (e.g., more than two months from) the first time interval, the computer system can remove the first user from the user inventory list. Additionally, the computer system can identify any endpoint devices and/or software license instances provisioned to the first user. Accordingly, the computer system can then reallocate resources provisioned to the inactive first user to optimize utilization of these enterprise resources.

The computer system can repeat this process for each other user connected to—and later disconnected from—the computer network.

8. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:
1. A method comprising:
    accessing a set of objects, generated by a set of sources during a first time interval, representing attributes of a set of assets affiliated with a computer network, the set of assets comprising:
        a set of endpoint devices; and
        a set of applications comprising a first application;
    extracting application identifying data from the set of objects;
    based on the application identifying data, partitioning the set of objects into a set of object groups comprising a first object group representing the first application during the first time interval;
    aggregating attributes represented in objects in the first object group into a first application container, in a set of applications containers, representing the first application;
    generating a first manifest of applications, comprising the first application, installed on endpoint devices in the set of endpoint devices during the first time interval based on the set of application containers;

in response to selection of the first application in the first manifest of applications at an operator portal, generating a visualization representing a first set of attributes exhibited by the first application during the first time interval, the first set of attributes comprising a first attribute representing a first subset of endpoint devices, in the set of endpoint devices, on which the first application is installed during the first time interval;

rendering the visualization at the operator interface;

accessing a first subset of endpoint device containers in a set of endpoint device containers, each endpoint device container, in the first subset of endpoint device containers, comprising fixed identifying data and variable status data representing an endpoint device in the first subset of endpoint devices; and for each endpoint device container in the first subset of endpoint device containers:
  generating a tag associating a corresponding endpoint device with the first application; and
  compiling the tag in the endpoint device container.

2. The method of claim 1:

wherein extracting application identifying data from the set of objects comprises:
  scanning a first subset of objects, in the set of objects and generated by a first source in the set of sources, for a first unique internal application identifier assigned to the first application by the first source; and
  scanning a second subset of objects, in the set of objects and generated by a second source in the set of sources, for a second unique internal application identifier assigned to the first application by the second source;

wherein partitioning the set of objects into the set of object groups comprises:
  partitioning the first subset of objects into the first object group based on the first unique internal application identifier; and
  partitioning the second subset of objects into a second object group based on the second unique internal application identifier; and wherein aggregating attributes represented in objects in the object group into the user container comprises:
  aggregating attributes represented in objects in the first object group into the first application container associated with the first source and comprising fixed identifying data and variable status data representing the first application; and
  aggregating attributes represented in objects in the second object group into a second application container, in the set of application containers, associated with the second source and comprising fixed identifying data and variable status data representing the first application.

3. The method of claim 2, further comprising:

calculating a first correspondence score for the first application container and the second application container based on:
  similarities of fixed identifying data stored in the first application container and the second application container; and
  similarities of concurrent variable status data stored in the first application container and the second application container; and in response to the first correspondence score exceeding a threshold correspondence score:
  identifying the first application container and the second application container as corresponding to the first application; and
  compiling fixed identifying data, comprising the second unique internal application identifier assigned to the first application by the second source, and variable status data contained in the second application container into the first application container.

4. The method of claim 1, further comprising:

accessing a second set of objects, generated by the set of sources during a second time interval succeeding the first time interval, representing attributes of a second set of assets affiliated with the computer network, the second set of assets comprising:
  a second set of endpoint devices; and
  a second set of applications comprising the first application;

partitioning the second set of objects into a second set of object groups comprising a second object group representing the first application during the second time interval;

aggregating attributes represented in objects in the second object group into the first application container; and based on the first application container and the first subset of endpoint device containers, generating a second visualization by:
  initializing the second visualization comprising:
    a first area corresponding to a second subset of endpoint devices, in the second set of endpoint devices, on which the first application is installed during the second time interval; and
    a second area corresponding to the first subset of endpoint devices associated with the tag and partially intersecting the first area; and
  annotating the first area, outside of the second area, with a representation of a third subset of endpoint devices, in the second set of endpoint devices, associated with the tag and comprising the first application.

5. The method of claim 1:

wherein accessing the set of objects comprises accessing a first object, generated by a first source in the set of sources, representing a second attribute representing a vulnerability exhibited by the first application;

wherein partitioning the set of objects comprises partitioning the set of objects into the set of object groups comprising the first object group comprising the first object;

wherein aggregating attributes represented in objects in the first object group comprises aggregating the second attribute into the first application container; and wherein generating the tag comprises generating the tag associating the corresponding endpoint device with the vulnerability exhibited by the first application.

6. The method of claim 1:

further comprising accessing a second attribute, defined in the first application container, representing a second subset of endpoint devices, in the set of endpoint devices, permitted to install the first application; and wherein generating the visualization comprises:
  initializing the visualization comprising:
    a first area corresponding to the first subset of endpoint devices; and
    a second area corresponding to the second subset of endpoint devices and partially intersecting the first area; and annotating the first area, outside of the second area, with a representation of a third subset of endpoint devices, in the set of endpoint devices, comprising the first application and excluded from the second subset of endpoint devices.

7. The method of claim 6, further comprising:
generating a notification to selectively investigate the third subset of endpoint devices based on the first application; and
serving the notification to a device associated with security personnel affiliated with the computer network.

8. The method of claim 6, further comprising:
for each endpoint device in the third subset of endpoint devices:
generating a command to uninstall the first application from the endpoint device; and
serving the command to the endpoint device.

9. The method of claim 1:
wherein extracting application identifying data from the set of objects comprises:
detecting a first application identifier value corresponding to the first application in a first object published by a first source in the set of sources; and
detecting a second application identifier value corresponding to the first application in a second object published by a second source in the set of sources; and
further comprising:
correlating the first application identifier value and the second application identifier value as corresponding to the first application;
normalizing the first application identifier value and the second application identifier value into a normalized application identifier value; and
compiling the normalized application identifier value into the first application container.

10. The method of claim 1:
wherein accessing the set of objects comprises accessing a first subset of objects, in the set of objects, generated by a first source, in the set of sources, configured on a first endpoint device in the first subset of endpoint devices, the first subset of objects defining a second set of applications:
installed on the first endpoint device during the first time interval; and
comprising the first application;
wherein partitioning the set of objects comprises partitioning the set of objects into the set of object groups comprising the first object group comprising the first subset of objects; and
wherein generating the visualization comprises generating the visualization representing the first subset of endpoint devices comprising the first endpoint device.

11. The method of claim 1, further comprising:
accessing a policy defining a first quantity of licenses associated with the first application;
calculating a second quantity of allocated licenses based on the first subset of endpoint devices; and
in response to a difference between the second quantity and the first quantity exceeding a threshold quantity:
generating a notification to selectively investigate the first quantity of licenses associated with the first application; and
serving the notification to a device associated with an administrator affiliated with the computer network.

12. The method of claim 1, further comprising:
accessing a policy defining a first quantity of licenses associated with the first application;
calculating a second quantity of allocated licenses based on the first subset of endpoint devices; and
in response to the second quantity exceeding the first quantity:
generating a notification to selectively investigate the first subset of endpoint devices; and
serving the notification to a device associated with an administrator affiliated with the computer network.

13. The method of claim 1:
wherein generating the visualization comprises generating the visualization representing the first set of attributes further comprising a second attribute representing a first subset of users, in the set of users, assigned to the first subset of endpoint devices during the first time interval; and
further comprising:
accessing a software profile corresponding to a first user in the first subset of users; and
in response to the software profile excluding the first application, selectively prompting security personnel to investigate the first user.

14. The method of claim 13, further comprising:
generating a software update to remove the first application from a first endpoint device, in the first subset of endpoint devices, assigned to the first user during the first time interval; and
serving the software update to the first endpoint device.

15. A method comprising:
accessing a set of objects, generated by a set of sources during a first time interval, representing attributes of a set of assets affiliated with a computer network, the set of assets comprising:
a set of endpoint devices;
a set of applications comprising a first application; and
a set of users;
based on application identifying data in the set of objects, partitioning the set of objects into a first set of object groups comprising a first object group representing the first application during the first time interval;
aggregating attributes represented in objects in the first object group into a first application container, in a set of applications containers, representing the first application, the first application container comprising:
a first attribute representing a first subset of endpoint devices, in the set of endpoint devices, on which the first application is installed during the first time interval; and
a second attribute representing a first subset of users, in the set of users, assigned to the first subset of endpoint devices during the first time interval;
accessing a set of user containers, each user container in the set of user containers:
representing a user in the first subset of users; and
comprising a third attribute representing a group to which the user is assigned during the first time interval;
based on the first application container and the set of user containers:
identifying a second subset of endpoint devices, in the first subset of endpoint devices, assigned to a second subset of users, in the first subset of users, assigned to a first group exhibiting permission associated with the first application; and
identifying a third subset of endpoint devices, in the first subset of endpoint devices, assigned to a third subset of users, in the first subset of users, assigned to a group absent permission associated with the first application; and generating a visualization representing:
  the second subset of endpoint devices, on which the first application is installed, assigned to the second subset of users assigned to the first group exhibiting permission associated with the first application; and
  the third subset of endpoint devices, on which the first application is installed, assigned to the third subset of users assigned to the group absent permission associated with the first application.

16. The method of claim 15:
wherein generating the visualization comprises:
  initializing the visualization comprising:
    a first area corresponding to the first subset of endpoint devices; and
    a second area corresponding to the second subset of endpoint devices and partially intersecting the first area; and
  annotating the first area, outside of the second area, with a representation of the third subset of endpoint devices; and
further comprising rendering the visualization at an operator portal.

17. The method of Claim 15, further comprising:
accessing a subset of user containers corresponding to the third subset of users; and
for each user container in the subset of user containers:
  generating a tag associating a user, represented by the user container, with the first application and absence of permission associated with the first application; and
  compiling the tag in the user container.

18. The method of claim 15, further comprising:
for each endpoint device in the third subset of endpoint devices:
  generating a command to uninstall the first application from the endpoint device; and
  serving the command to the endpoint device.

19. A method comprising:
accessing a set of objects, generated by a set of sources during a first time interval, representing attributes of a set of assets affiliated with a computer network, the set of assets comprising:
  a set of endpoint devices; and
  a set of applications comprising a first application;
extracting application identifying data from the set of objects;
based on the application identifying data, partitioning the set of objects into a set of object groups comprising a first object group representing the first application during the first time interval;
aggregating attributes represented in objects in the first object group into a first application container, in a set of applications containers, representing the first application;
generating a first manifest of applications, comprising the first application, installed on endpoint devices in the set of endpoint devices during the first time interval based on the set of application containers;
in response to selection of the first application in the first manifest of applications at an operator portal:
  accessing a first attribute, defined in the first application container, representing a second subset of endpoint devices, in the set of endpoint devices, permitted to install the first application;
  generating a visualization representing a first set of attributes exhibited by the first application during the first time interval, the first set of attributes comprising a second attribute representing a first subset of endpoint devices, in the set of endpoint devices, on which the first application is installed during the first time interval, the visualization comprising:
    a first area corresponding to the first subset of endpoint devices; and
    a second area corresponding to the second subset of endpoint devices and partially intersecting the first area; and
  annotating the first area, outside of the second area, with a representation of a third subset of endpoint devices, in the set of endpoint devices, comprising the first application and excluded from the second subset of endpoint devices; and
rendering the visualization at the operator interface.

20. A method comprising:
accessing a set of objects, generated by a set of sources during a first time interval, representing attributes of a set of assets affiliated with a computer network, the set of assets comprising:
  a set of endpoint devices; and
  a set of applications comprising a first application;
extracting application identifying data from the set of objects;
based on the application identifying data, partitioning the set of objects into a set of object groups comprising a first object group representing the first application during the first time interval;
aggregating attributes represented in objects in the first object group into a first application container, in a set of applications containers, representing the first application;
generating a first manifest of applications, comprising the first application, installed on endpoint devices in the set of endpoint devices during the first time interval based on the set of application containers;
in response to selection of the first application in the first manifest of applications at an operator portal, generating a visualization representing a first set of attributes exhibited by the first application during the first time interval, the first set of attributes comprising a first attribute representing a first subset of endpoint devices, in the set of endpoint devices, on which the first application is installed during the first time interval;
rendering the visualization at the operator interface;
accessing a policy defining a first quantity of licenses associated with the first application;
calculating a second quantity of allocated licenses based on the first subset of endpoint devices; and
in response to a difference between the second quantity and the first quantity exceeding a threshold quantity:
  generating a notification to selectively investigate the first quantity of licenses associated with the first application; and
  serving the notification to a device associated with an administrator affiliated with the computer network.

21. A method comprising:
accessing a set of objects, generated by a set of sources during a first time interval, representing attributes of a set of assets affiliated with a computer network, the set of assets comprising:
  a set of endpoint devices; and
  a set of applications comprising a first application;

extracting application identifying data from the set of objects;

based on the application identifying data, partitioning the set of objects into a set of object groups comprising a first object group representing the first application during the first time interval;

aggregating attributes represented in objects in the first object group into a first application container, in a set of applications containers, representing the first application;

generating a first manifest of applications, comprising the first application, installed on endpoint devices in the set of endpoint devices during the first time interval based on the set of application containers;

in response to selection of the first application in the first manifest of applications at an operator portal, generating a visualization representing a first set of attributes exhibited by the first application during the first time interval, the first set of attributes comprising:
- a first attribute representing a first subset of endpoint devices, in the set of endpoint devices, on which the first application is installed during the first time interval; and
- a second attribute representing a first subset of users, in the set of users, assigned to the first subset of endpoint devices during the first time interval;

rendering the visualization at the operator interface;

accessing a software profile corresponding to a first user in the first subset of users; and in response to the software profile excluding the first application, selectively prompting security personnel to investigate the first user.

\* \* \* \* \*